US012624893B2

(12) United States Patent
Newman et al.

(10) Patent No.: US 12,624,893 B2
(45) Date of Patent: May 12, 2026

(54) DRYING APPARATUS

(71) Applicant: Oregon DryTech, LLC, Klamath Falls, OR (US)

(72) Inventors: Gregory Newman, Klamath Falls, OR (US); Tom Valenzuela, Klamath Falls, OR (US); John Lowell Bowers, Klamath Falls, OR (US); Jared Estrada, Klamath Falls, OR (US)

(73) Assignee: Oregon Drytech, LLC, Klamath Falls, OR (US)

(*) Notice: Subject to any disclaimer, the term of this patent is extended or adjusted under 35 U.S.C. 154(b) by 1087 days.

(21) Appl. No.: 17/675,804

(22) Filed: Feb. 18, 2022

(65) Prior Publication Data

US 2022/0214107 A1 Jul. 7, 2022

Related U.S. Application Data

(63) Continuation-in-part of application No. PCT/US2021/025920, filed on Apr. 6, 2021.

(Continued)

(51) Int. Cl.
*F26B 17/02* (2006.01)
*F26B 21/10* (2006.01)

(Continued)

(52) U.S. Cl.
CPC ............ *F26B 17/023* (2013.01); *F26B 21/10* (2013.01); *F26B 25/20* (2013.01); *F26B 3/20* (2013.01)

(58) Field of Classification Search
CPC ........ F26B 17/023; F26B 21/10; F26B 25/20; F26B 3/20; F26B 15/18
See application file for complete search history.

(56) References Cited

U.S. PATENT DOCUMENTS 1,791,728 A * 2/1931 Linfesty .................. F26B 25/00 198/496
2,118,212 A * 5/1938 Maclaurin ............ D21H 5/0047 118/325
3,250,315 A 5/1966 Osborne et al.

(Continued)

FOREIGN PATENT DOCUMENTS

EP 2330370 A2 6/2011
GB 1164462 8/1966

(Continued)

OTHER PUBLICATIONS

International Search Report and Written Opinion issued by the United States Patent and Trademark Office in corresponding International Application No. PCT/US2021/025920; mailing date: Sep. 8, 2021; (14 pages).

*Primary Examiner* — Michael G Hoang
*Assistant Examiner* — Bao D Nguyen
(74) *Attorney, Agent, or Firm* — Klarquist Sparkman, LLP

(57) ABSTRACT

A drying apparatus can include a wet end portion, a dry end portion, and a drying chamber. The wet end portion can include a spray apparatus configured to apply a product puree to a belt, and the dry end portion can include a knife portion configured to remove a dry product from the belt. The drying chamber can extend between the wet end portion and the dry end portion and can include one or more table sections. Each table section can include a basin portion and one or more temperature control elements. The drying chamber can further include an air inlet and an air outlet such that air can flow through the drying chamber in a direction opposite a direction of the belt.

21 Claims, 17 Drawing Sheets

Related U.S. Application Data

(60) Provisional application No. 63/007,099, filed on Apr. 8, 2020.

(51) Int. Cl.
*F26B 25/20* (2006.01)
*F26B 3/20* (2006.01)

(56) References Cited

U.S. PATENT DOCUMENTS 3,605,191 A * 9/1971 Kaspar .................. B29C 39/148 425/223
3,869,249 A * 3/1975 Frische ................... F26B 15/18 432/152
4,556,572 A 12/1985 Kaufman, Jr. et al.
4,631,837 A 12/1986 Magoon
6,026,588 A * 2/2000 Clark .................... F26B 21/145 34/77
6,047,484 A 4/2000 Bolland et al.
6,182,375 B1* 2/2001 Banerjee ............... F26B 17/026 264/109
6,990,748 B2 1/2006 Magnon et al.
2002/0088137 A1* 7/2002 Savarese ................ F26B 13/10 34/266
2007/0193603 A1 8/2007 Cezary
2008/0260915 A1 10/2008 Alkayali
2011/0016742 A1 1/2011 Anderson et al.
2012/0151790 A1 6/2012 Savarese
2014/0110320 A1* 4/2014 Thomas .................... A23L 7/17 210/138
2014/0259725 A1 9/2014 Rossi et al.
2018/0045462 A1 2/2018 Baeghbali et al.

FOREIGN PATENT DOCUMENTS

WO WO 2007/105941 A1 9/2007
WO WO 2019/212896 A1 11/2019

* cited by examiner

DRYING APPARATUS

CROSS REFERENCE TO RELATED APPLICATIONS

This application is a Continuation-in-part of Patent Cooperation Treaty Application Serial No. PCT/US2021/025920, entitled DRYING APPARATUS, filed Apr. 6, 2020, and also claims the benefit of U.S. Provisional Application Ser. No. 63/007,099, entitled DRYING APPARATUS, filed on Apr. 8, 2020, which applications are incorporated by reference herein in their entirety.

FIELD

The present disclosure relates to embodiments of a heat transfer apparatus and method for drying substances, such as food substances.

BACKGROUND

Conventional drying processes such as spray drying, freeze drying, and drum drying can be used to dehydrate products for sale or storage. However, such drying processes can degrade the nutritional value, color, and flavor of the processed products, can render the products unlikely to remain viable for long periods of storage, and/or can be expensive to utilize from both a product throughput and energy efficiency perspective. Accordingly, a need exists for improved drying apparatuses.

SUMMARY

Described herein are embodiments of an improved drying apparatus, as well as methods for using such an apparatus.

In a representative embodiment, a drying apparatus can comprise a wet end portion, a dry end portion, and a drying chamber. The wet end portion comprising a spray apparatus configured to apply a product puree to a belt and the dry end portion comprising a knife portion configured to remove a dry product from the belt. The drying chamber extending between the wet end portion and the dry end portion and comprising one or more table sections, each table section comprising a basin portion and one or more temperature control elements, the drying chamber comprising an air inlet and an air outlet such that air can flow through the chamber in a direction opposite a direction of the belt.

In some or all embodiments, the wet end portion comprises a first roller spaced apart from a second roller along a first axis, and wherein the belt is configured to extend over the first roller and beneath the second roller. In some or all embodiments, the first roller is offset from the second roller along a second axis such that a portion of the belt disposed between the first and second rollers is angled relative to the spray apparatus.

In some or all embodiments, the spray apparatus is pivotable relative to the belt. In some or all embodiments, the spray apparatus is an elongated bar or member comprising a plurality of openings disposed along a length of the bar, the openings extending through a wall of the bar. In some or all such embodiments, the openings taper from a first diameter at an inner surface of the bar to a second diameter at an outer surface of the bar.

In some or all embodiments, the drying chamber comprises one or more baffles configured to create turbulent airflow within the drying chamber.

In some or all embodiments, each table section further comprises a holding tank into which the temperature control elements at least partially extend, and wherein the temperature control elements are configured adjust the temperature of a fluid disposed within the holding tank until the fluid reaches a selected temperature. In some or all such embodiments, each table section comprises a diffuser bar configured to allow fluid from the holding tank to be pumped into the basin portion.

In some or all embodiments, the temperature control elements are electrically powered. In some or all embodiments, the temperature control elements are powered using one or more solar panels.

In some or all embodiments, the dry end portion further comprising a bullnose portion, wherein the bullnose portion is positioned at an angle relative to the knife portion such that when the belt passes between the bullnose portion and the knife portion the belt forms a Z-bend.

In some or all embodiments, the dry end portion further comprising a top roller and a drive roller, wherein the drive roller is configured to drive the belt through the drying apparatus. In some or all such embodiments, a leading edge of the top roller is offset from a leading edge of the drive roller along a second axis such that a portion of the belt disposed between the two rollers is angled relative to the knife portion.

In some or all embodiments, the drying apparatus further comprises a brush device configured to selectively remove remaining dry product from the belt. In some or all such embodiments, the brush device comprises a brush portion, a first brush roller, and a second brush roller, and wherein the brush device is pivotable between an engaged position, in which the brush portion contacts the belt, and a disengaged position in which the brush portion does not contact the belt.

In some or all embodiments, the drying apparatus is disposed within an environmental control room configured to allow an operator to adjust the humidity within the environmental control room.

In a representative embodiment, a method comprises spraying a product puree onto a continuous belt portion and driving the belt in a first direction such that the product puree moves into a drying chamber. The method further comprises flowing air along the belt in a second direction opposite the first direction to remove water from the product puree to create a dry product and driving the belt through a Z-bend to remove the dry product from the belt.

In some or all embodiments, the method further comprises driving the belt through a brush device to remove any remaining dry product from the belt.

The foregoing and other objects, features, and advantages of the disclosure will become more apparent from the following detailed description, which proceeds with reference to the accompanying figures.

DETAILED DESCRIPTION

Described herein are embodiments of a drying apparatus or dryer for dehydrating, partially dehydrating, and/or desiccating a substance or product. The described dryers can be used to dehydrate a variety of products, including, for example, organic materials, minerals, chemicals, etc. In some examples, a product can comprise food substances (e.g., vegetables, fruits, fungi, algae, meat products including seafood and shellfish, spices, herbs, etc.), paper pulp, pigments, biopharma ingredients, etc. Such products can be processed into a sludge, slurry, or puree prior to being dried. The sludge, slurry, or pureed product can also be referred to herein as "wet product."

Figure 1:
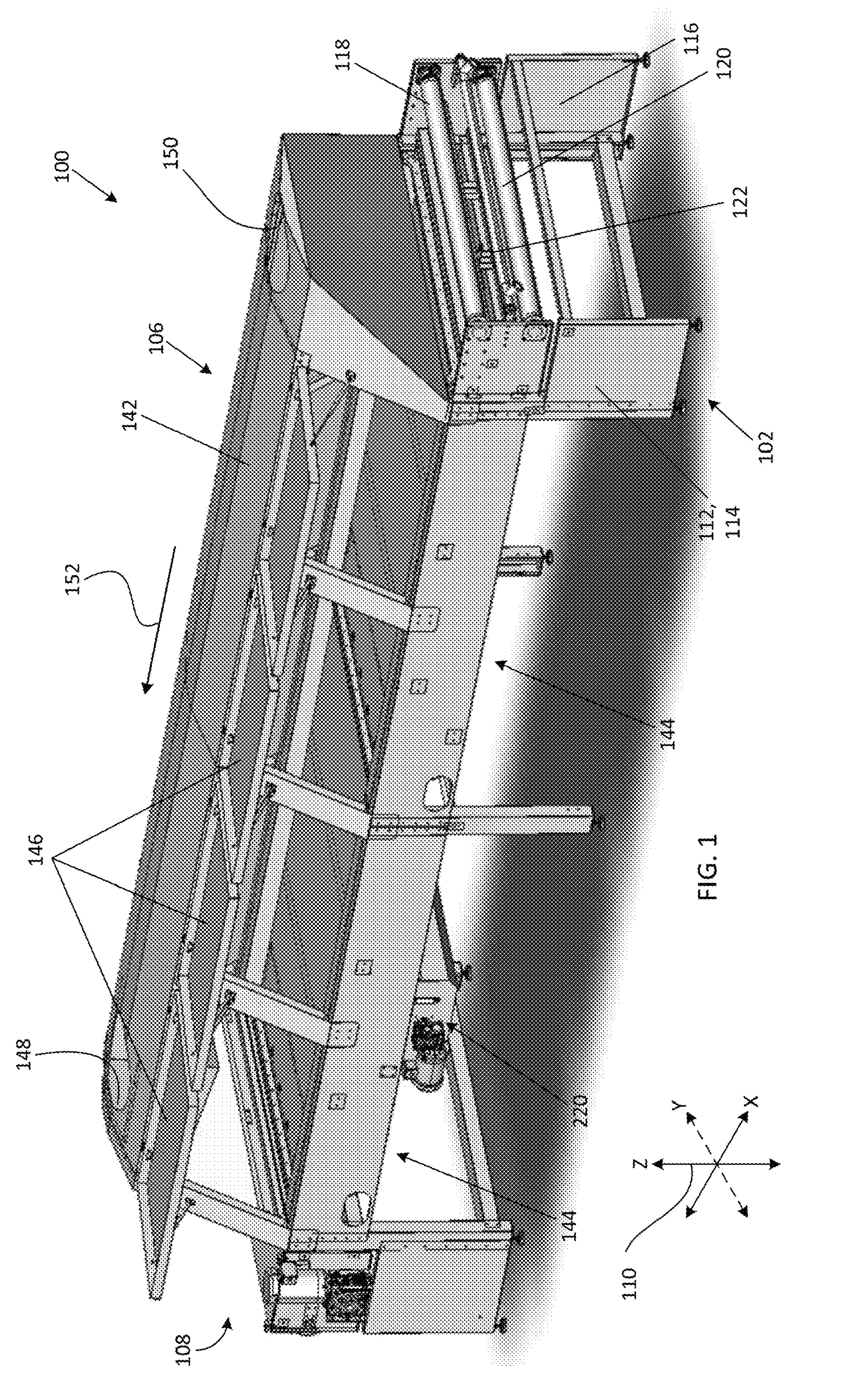
FIG. 1 is a perspective view of a drying apparatus, according to one embodiment.

FIG. 1 illustrates an exemplary embodiment of a drying apparatus 100 comprising a wet end portion 102, a belt 104 (see e.g., FIG. 3), a drying chamber 106, a dry end portion 108, and a control unit (not shown). Generally, wet product such as a product puree can be applied to the belt 104 at the wet end portion 102 and can travel on the belt 104 through the drying chamber 106 in the X-direction, as shown with respect to coordinate system 110. As the product puree passes through the drying chamber 106, it gradually and gently dehydrates until it reaches a selected level of desiccation, at which point it is referred to herein as "dry product." The product puree can be heated at temperatures ranging from, for example, about 30° C. to about 90° C., which advantageously ensures that the dry product retains the nutritional integrity, original color, and flavor of the original product.

In some embodiments, the selected level of desiccation can be less than 10% water by weight, less than 7% water by weight, less than 5% water by weight, or less than 3% water by weight. In some particular embodiments, the selected level can be between about 7% and about 3%. The dry product can then be removed from the belt 104 at the dry end portion 108.

Figure 2:
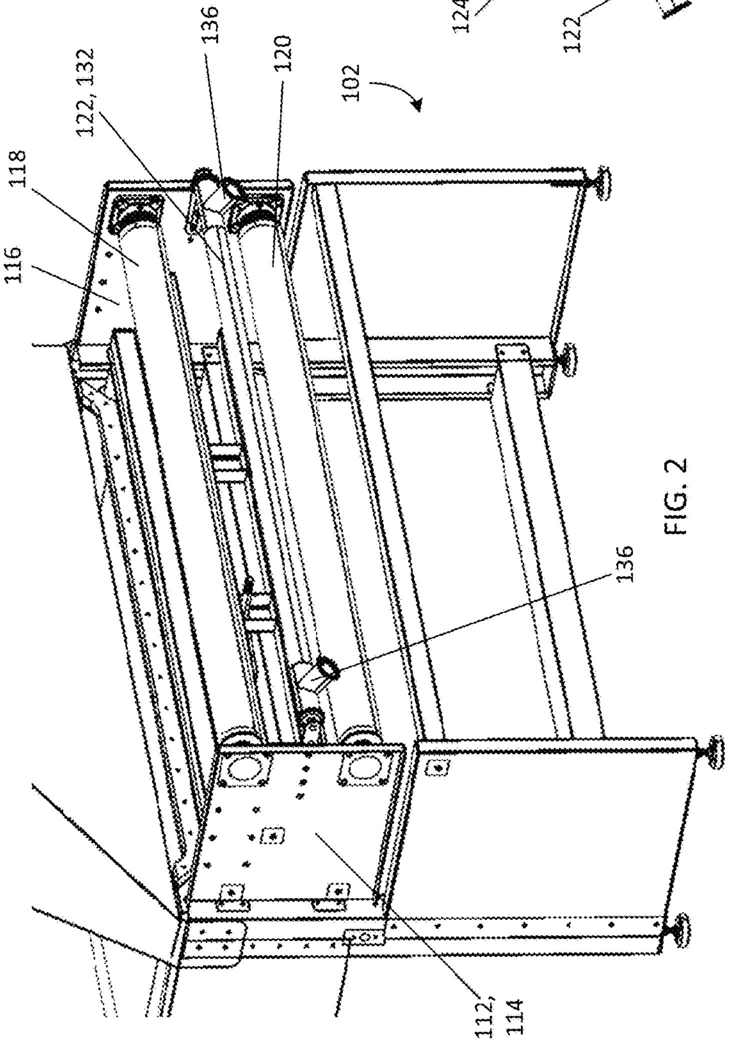
FIG. 2 is a perspective view of a wet end portion of the drying apparatus of FIG. 1.

Referring now to FIG. 2, the wet end portion 102 of the dryer 100 can comprise a frame 112 having a first side portion 114 and a second side portion 116 between which a first roller 118, a second roller 120, and a spray apparatus 122 extend. The first roller 116 can be axially spaced from the second roller 118 in a Z-direction, as shown with respect to coordinate system 110 (see FIG. 1). For example, the first roller 118 is above the second roller 120 in the orientation shown in FIG. 2. The spray apparatus 122 can be positioned between the first and second rollers 118, 120 along the Z-axis.

Figure 3:
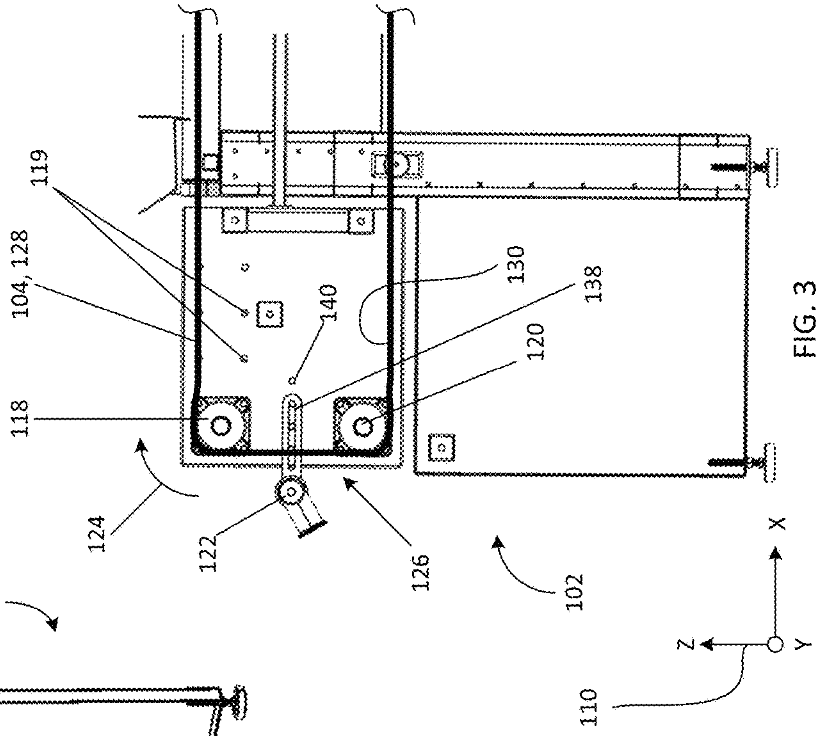
FIG. 3 is a side elevational view of the wet end portion of the drying apparatus of FIG. 1.

As shown in FIG. 3, the belt 104 can extend over the first and second rollers 118, 120 and can move in the direction shown by arrow 124. The spray apparatus 122 can spray puree onto a portion 126 of the outer surface 128 of the belt 104 that extends between the first and second rollers 118, 120. In FIG. 3, the first roller 118 is aligned with the second roller 120 in the X-direction (e.g., roller 118 is directly above roller 120) such that the portion 126 of the belt 104 between the two rollers 118,120 extends substantially in the Z-direction. However, the first roller 118 can be movable relative to the second roller 120 such that it can be offset from the second roller 120 in the X-direction. The side portions 114, 112 of the frame 112 can each comprise a plurality of sequential apertures 119 configured to allow the first roller 118 to be positioned at a variety of different angles relative to the second roller 120. When the first roller 118 is offset from the second roller 120, the portion of the belt 126 disposed between the two rollers 118, 120 can be angled such that wet product can more easily adhere to the outer surface 128 of the belt 104. For example, the first roller 118 can be positioned at a 45 degree angle relative to the second roller 120. In other embodiments, the second roller 120 can be movable relative to the first roller 118.

The first and second rollers 118, 120 can be, for example, stainless steel rollers. In a particular example, the first and second rollers can be 4-inch rollers. In such embodiments, the portion 126 of the belt 104 between the two rollers 118, 120 can have a length of between, for example, about 12 inches and about 18 inches.

The belt 104 can be a continuous conveyor belt having an outer surface 128 onto which the puree is applied, and an inner surface 130 that contacts the first and second rollers 118, 120. In some embodiments, the belt 104 can comprise a mylar material. In some particular embodiments, the belt 104 can be about 0.008 inches thick and about 62.5 inches wide. However, the belt 104 can have any of various dimensions depending on the dimensions of the drying apparatus and/or the type of product puree to be applied.

The wet end portion 102 can be movable relative to the drying chamber 106 in the X-direction to accommodate various belt 104 lengths and to maintain tension in the belt 104. The wet end portion 102 can, in some embodiments, further comprise a belt tension device configured to maintain tension in the belt 104 via, for example, one or more air cylinders.

In the illustrated embodiment, the spray apparatus 122 is an elongated member 132 comprising a plurality of channels 134 (see e.g., FIG. 4) disposed along a length of the member 132 and oriented toward the outer surface 128 of the belt 104. The elongated member 132 can comprise one or more inlets 136 configured to be coupled to one or more pumps. The pumps can be coupled to one or more puree containers and/or troughs containing the product puree to be dried. In some embodiments, the one or more puree containers can comprise a temperature control system including, for example, a heating system and/or a refrigeration system. The puree containers can further comprise one or more circulation pumps that circulate the puree to keep the particles in suspension rather than allowing them to settle to the bottom of the container.

Figure 4:
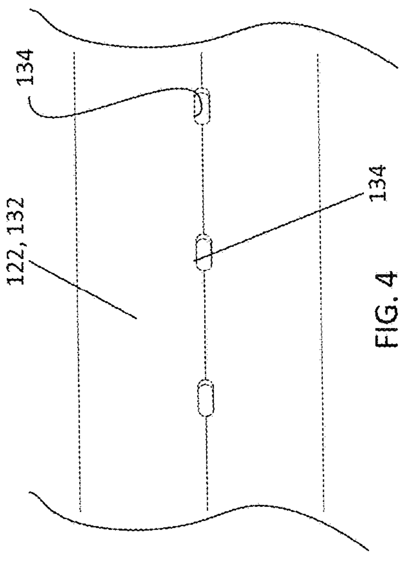
FIG. 4 is a perspective view of a portion of the spraying apparatus of the wet end portion of FIG. 2.

Referring to FIG. 4, the channels 134 can extend through a thickness of a wall of the elongated member 132. The channels 134 can be configured to spray product puree onto the belt 104 in a fan-type pattern. For example, each channel 134 can have a first width at a radially inner surface of the elongated member 132 and a second width at a radially outer surface of the elongated member 132. The second width can be greater than the first width such that the channel flares outwardly as it extends through the thickness of the member 132. Such a configuration allows the puree to spray out of the member 132 in a fan-type pattern.

In other embodiments, the spray apparatus 122 can be a spray gun apparatus similar to, for example, a paint gun. The spray gun apparatus can be positioned centrally relative to a width of the belt 104 and can pivot in the Y-direction to apply the product puree along the width of the belt 104. In such embodiments, the belt 104 can move in a halting pattern (e.g., movement, pause, movement, pause, etc.) such that the spray gun apparatus has time to fully coat the width of the belt 104 with product puree.

The spray apparatus 122 can be coupled to the frame 112 via an adjustable coupling 138. The adjustable coupling 138 can be configured to allow the spray apparatus 122 to move closer and/or further relative to the belt 104 (e.g., in the X-direction as shown by coordinate system 110). The side portions 114, 112 of the frame 112 can comprise a plurality of sequential apertures 140 configured to allow the spray apparatus 122 to be positioned at a variety of different angles relative to the second roller 120. The spray apparatus 122 can be pivotably coupled to the adjustable coupling, such that the angle of the spray extruded from the spray apparatus 122 can be adjusted relative to the belt 104. For example, in some embodiments, the openings 134 can be directed to a portion of the belt 104 that is nearer to the first roller 118 or nearer to the second roller 120. This configuration advantageously allows the openings 134 to be angled differently relative to the belt 104 based on the thickness and/or viscosity of the product puree.

As the wet product is applied to the belt 104, some of the wet product can run back down the belt 104 toward the second roller 120, allowing the wet product to spread to a substantially uniform thickness. Thicker and/or more viscous wet product slurries or purees can advantageously be applied to the belt 104 nearer the second roller 120, thereby giving the puree or slurry additional time to spread to a substantially uniform thickness before entering the drying chamber 106.

Puree that falls from the belt 104 (e.g., "run-off puree") can be caught in a trough or collecting pan (not shown). The collecting pan can comprise one or more pumps (e.g., scavenging pumps) that pump the run-off puree back into the puree container and/or back into the spray apparatus 122.

Once the product puree has been applied to the belt 104, the belt 104 can move the puree into the drying chamber 106. Referring again to FIG. 1, The drying chamber 106 can comprise a housing 142 and one or more table sections 144. The housing 142 can comprise one or more panels 146 pivotably connected to the housing 142 and movable between an open position (see e.g., FIG. 1) and a closed position (see e.g., FIG. 5, in which half the panels 146 are shown in the closed position). When in the open position, a user can view the belt 104 (and therefore the product slurry) as it passes through the drying chamber 106. When in the closed position, the panels 146 define a chamber through which air can flow.

Figure 6:
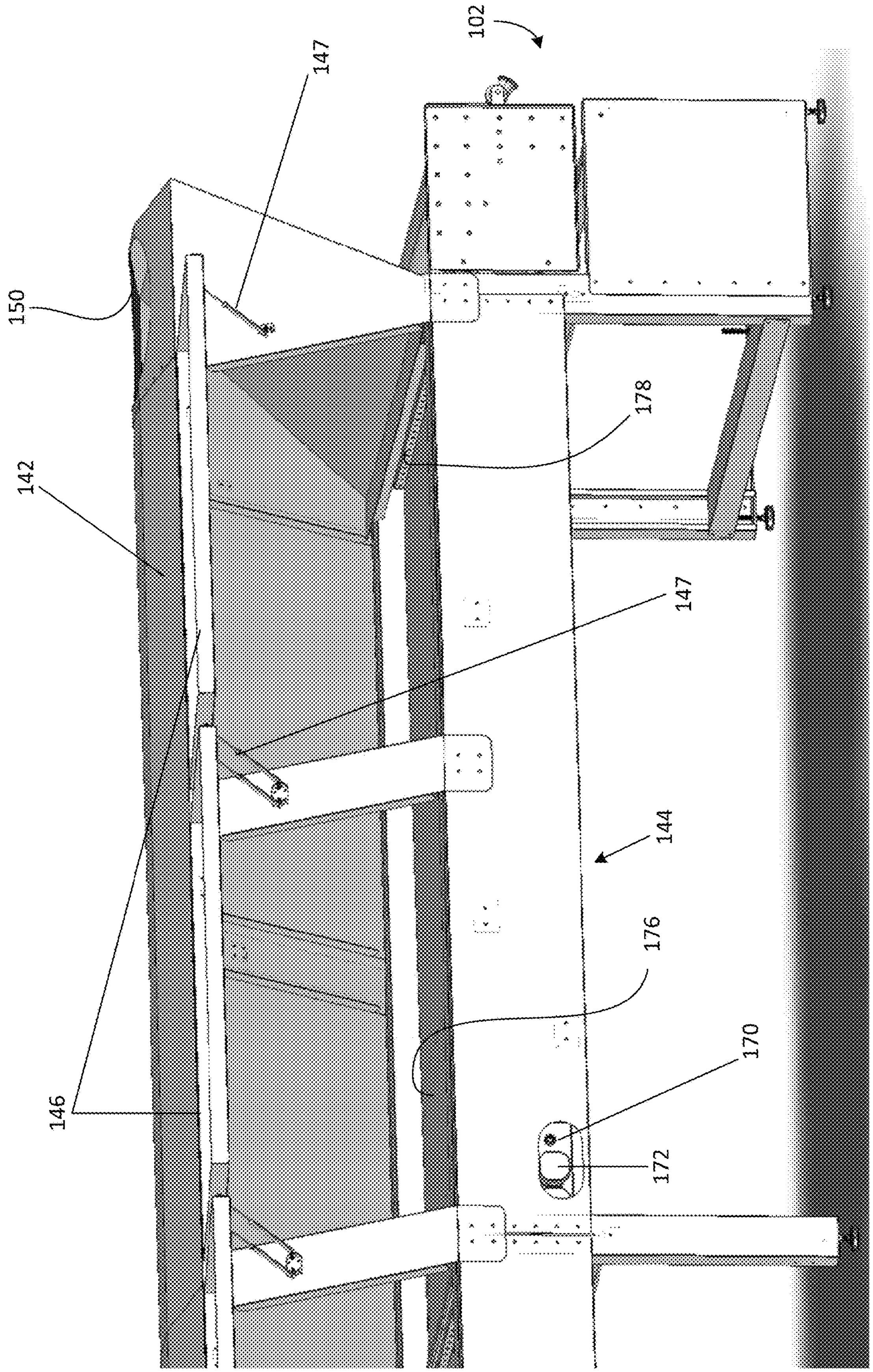
FIG. 6 is a another perspective view of a portion of the drying apparatus of FIG. 1.

Referring now to FIG. 6, the panels 146 can be pivotably coupled to the housing 142 via one or more air cylinders 147. In some embodiments, such as the illustrated embodiment, each panel 146 can be coupled to two air cylinders 147 configured to raise and/or lower the panels 146. In some embodiments, the air cylinders can be actuated via the control unit. In other embodiments, in addition to or in lieu of air cylinders 147, each panel can comprise a respective locking device configured to retain the panel 146 in the open or closed position.

Figure 5:
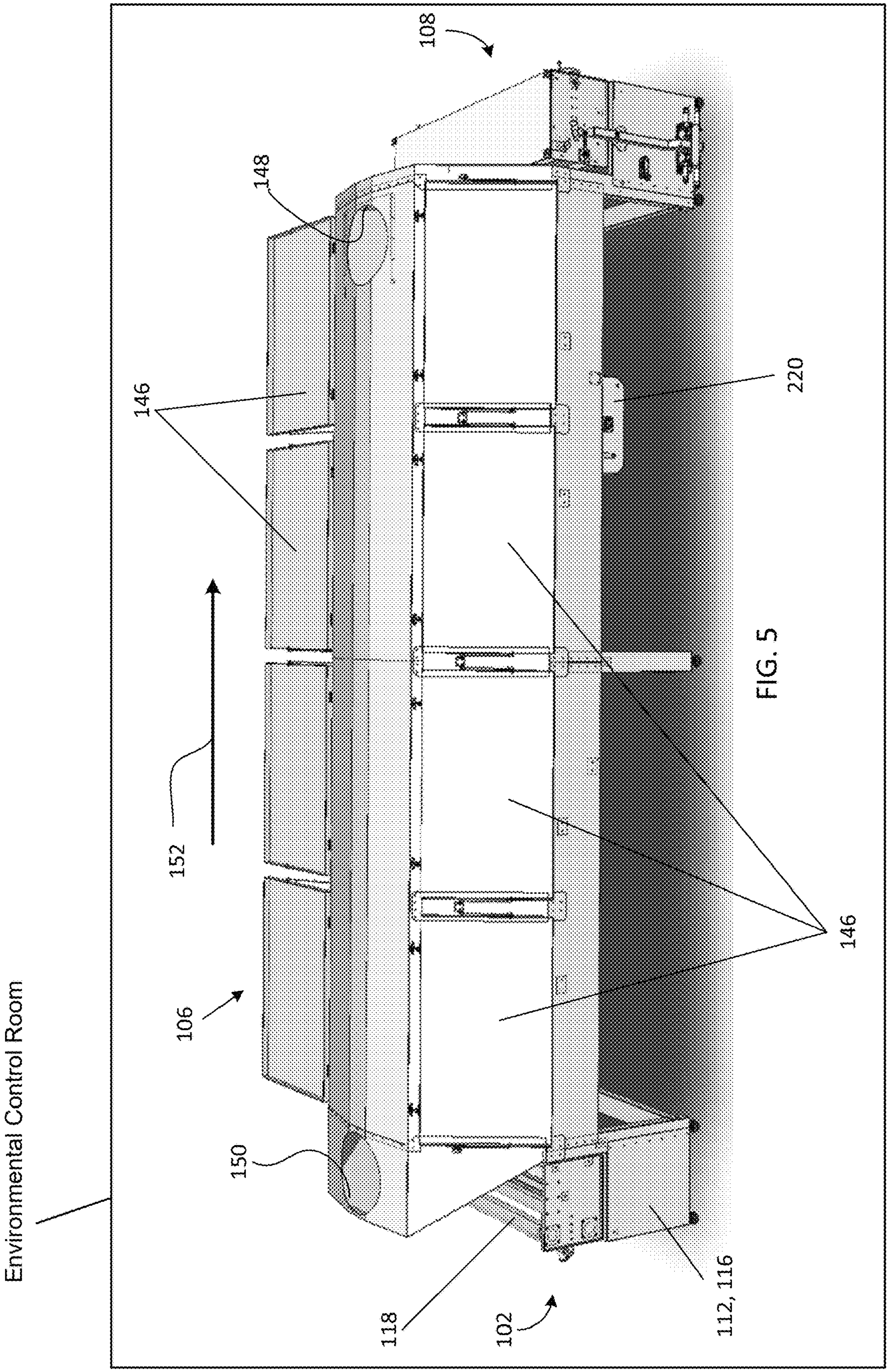
FIG. 5 is a perspective view of the drying apparatus of FIG. 1.

Referring to FIG. 5, the housing 142 can have an air inlet 148 (e.g., adjacent the dry end portion 108) and an air outlet 150 (e.g., adjacent the wet end portion 102). Air can be pumped through the air inlet 148 via one or more air ducts, using, for example, a first fan (e.g., a 10-hp high pressure fan). The air can flow through the drying chamber 106 from the inlet 148 to the outlet 150 in a direction opposite the direction of movement of the belt 104. For example, the belt 104 can move from the wet end portion 102 to the dry end portion 108 as indicated by arrow 152 and the air can flow from the dry end portion 108 to the wet end portion 102 in the opposite direction. The air can be removed or exhausted from the drying chamber 106 via the outlet 150 using, for example, a second fan (e.g., a 10-hp high pressure fan). Using separate first and second fans can advantageously allow pressure to be balanced within the drying chamber 106.

In some embodiments, the drying chamber 106 can utilize atmospheric air (e.g., air pumped in from outside). In such embodiments, the atmospheric air can pass through a filter prior to entering the drying chamber 106. In some embodiments, the atmospheric air can be heated and/or cooled prior to entering the drying chamber 106 in order to mitigate humidity. For example, incoming air temperature can be raised by about 40 degrees prior to the air entering the drying chamber 106. In some embodiments, airflow within the drying chamber 106 can be between 7,000 $ft^3$/min and 11,000 $ft^3$/min. Inlet and outlet fan speeds can be controlled by, for example, one or more frequency drives, which can be controlled via the control unit.

Figure 7:
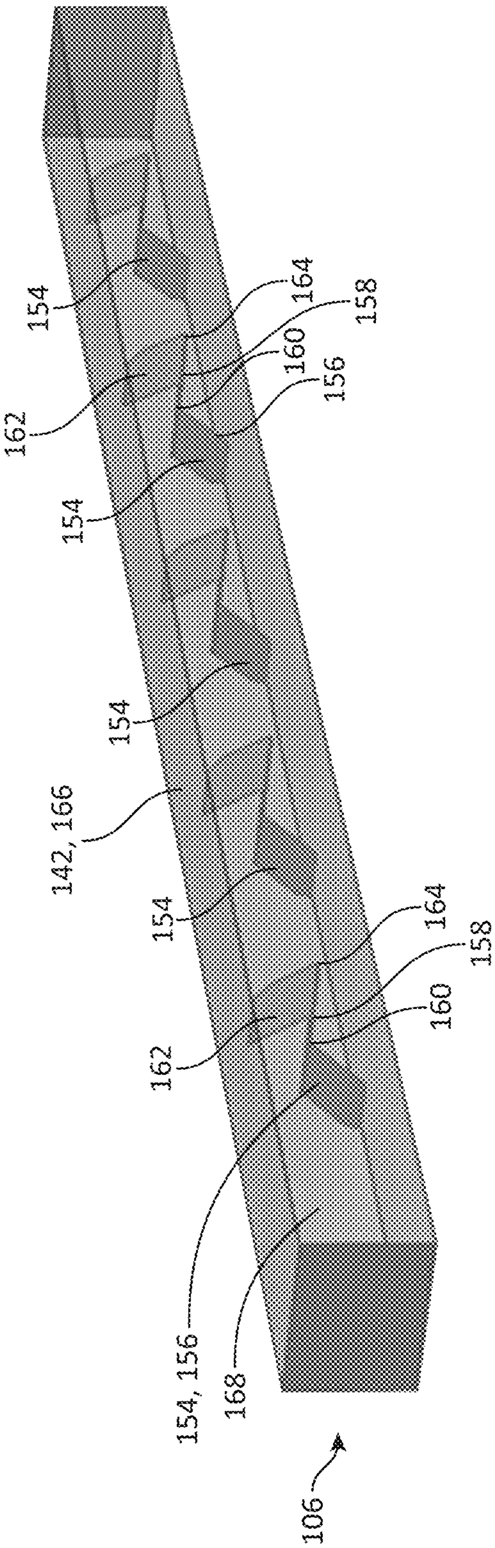
FIG. 7 is an embodiment of a drying chamber of a drying apparatus, according to one embodiment.
Figure 8:
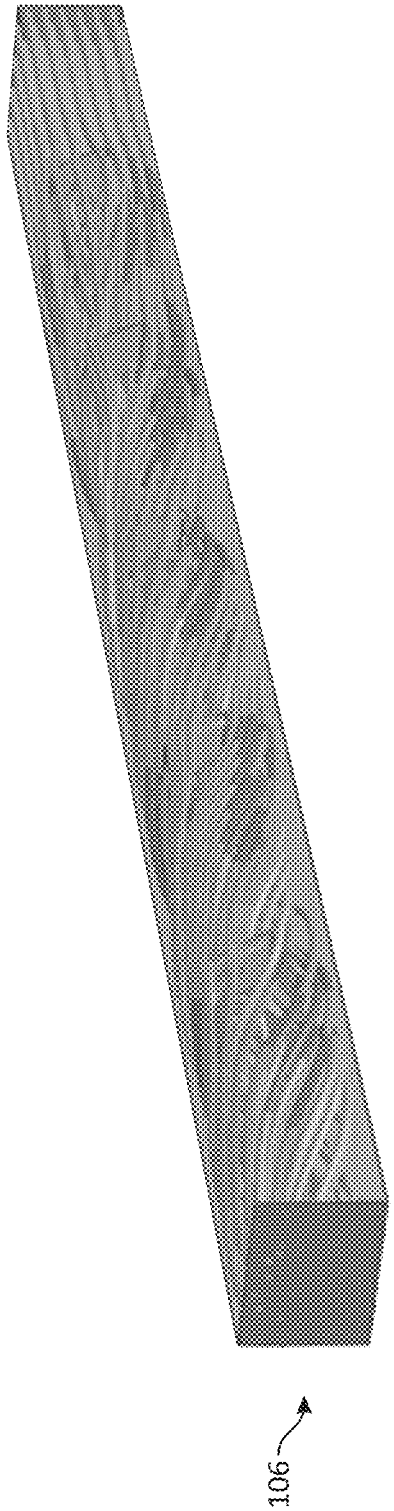
FIG. 8 illustrates a simulation of air flow through the drying chamber of FIG. 7.

In some embodiments, as seen in FIG. 7, the drying chamber 106 can include one or more baffles 154 configured to disrupt the flow of air through the chamber. Without the baffles 154, air flows through the chamber in a laminar fashion and the layer of air nearest the product puree absorbs water from the puree and becomes saturated. The water-saturated air is heavier and therefore remains on top of the puree as a "bound layer" preventing drier air from reaching the product. The baffles 154 can be configured to create a swirling or turbulent flow of air through the drying chamber 106, thereby disrupting the bound layer and speeding the drying process. The turbulent air flow caused by the baffles 154 forces the water-saturated air to mix with the drier air and moves the drier air adjacent the puree, allowing the drier air to absorb water from the puree and thereby allowing a greater total volume of water to be absorbed by the air. FIG. 8 illustrates a simulation of air flow through the drying chamber 106 with the baffles 154 installed.

The one or more baffles 154 can be coupled to an upper or ceiling portion 166 of the housing 142, to a side portion 168 of the housing 142, and/or to a respective panel 146. In some embodiments, the baffles 154 can be permanently coupled to the housing 142, such as by welding, adhesives, etc. In other embodiments, the baffles 154 can be removably coupled to the housing 142, for example by mechanical fasteners such as screws etc. The baffles 154 can be rearranged and/or removed as required by a specific product puree to be dried.

In the embodiment of FIG. 7, the baffles 154 have a “zig-zag” shape comprising a first straight portion 156, a second straight portion 158 coupled to the first straight portion 156 at a first bend 160, and a third straight portion 162 coupled to the second straight portion 158 at a second bend 164. However, in other embodiments, the baffles can have any of various shapes configured to create a non-laminar and/or turbulent flow within the drying chamber 106. Though FIG. 7 shows five baffles 154 disposed within the drying chamber 106, in other embodiments, any number of baffles 154 can be used depending on, for example, the length of the drying chamber, the humidity within the drying chamber, the selected product puree to be dried, the humidity of the atmospheric air, etc.

Certain products or slurries may be particularly sensitive to higher temperatures (which can, for example, degrade the nutritional value, color, and/or structural integrity of the product). In such cases, the drying chamber 106 can further comprise one or more dehumidification devices configured to help dry the product puree at a lower temperature. In such embodiments, the air that passes through the drying chamber 106 can be recycled within the drying apparatus 100 system rather than being exhausted to the atmosphere. This configuration advantageously allows only the moisture released during the drying process to be extracted and mitigates the need to remove moisture from large volumes of atmospheric air. The dehumidification devices can be disposed, for example, on the roof of the drying apparatus 100. In embodiments wherein the drying apparatus 100 is contained within an environmentally controlled room or chamber, the dehumidification devices can be disposed outside the chamber to control the level of humidity within the chamber.

As mentioned previously, the drying chamber 106 can comprise one or more table sections 144. The table sections 144 can be configured to heat a layer of water, over which the belt 104 (including the product puree) passes. As the belt 104 passes over the water layer, the heat from the water layer is transferred to the product puree, thereby evaporating water from the product puree and desiccating the puree to a selected level of dryness.

In the illustrated embodiment, as shown in FIG. 1, the drying chamber 106 comprises two table sections 144. However, in other embodiments, the drying chamber 106 can comprise any number of table sections 144 to produce a selected length of the drying chamber 106. For example, the drying chamber 106 can comprise one, three, four, five, six, seven, eight, nine, or ten table sections 144. In some particular embodiments, each table section can have a length of about 10 feet.

Figure 9:
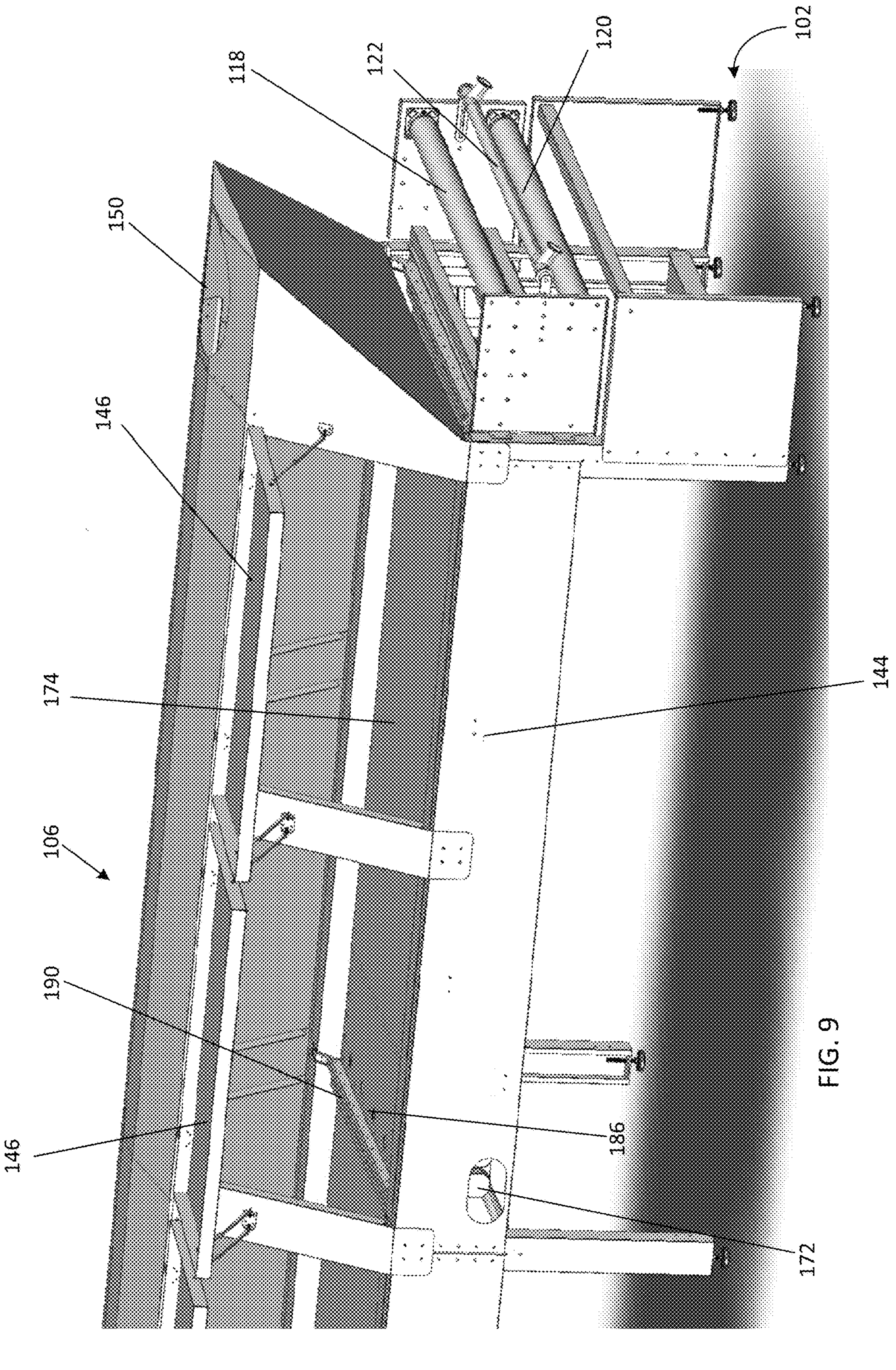
FIG. 9 is a perspective view of a portion of the drying apparatus of FIG. 1.
Figure 10:
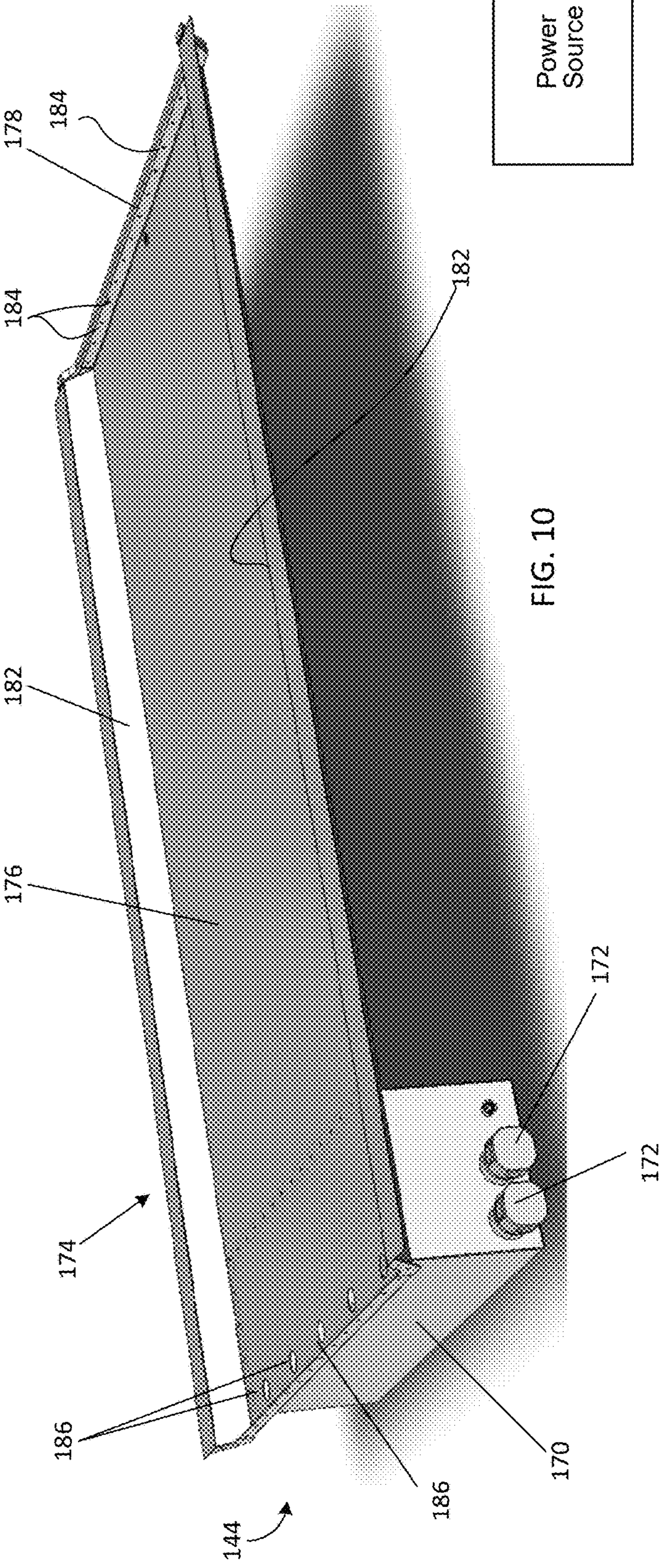
FIG. 10 is a perspective view of a table section of a drying apparatus, according to one embodiment.
Figure 11:
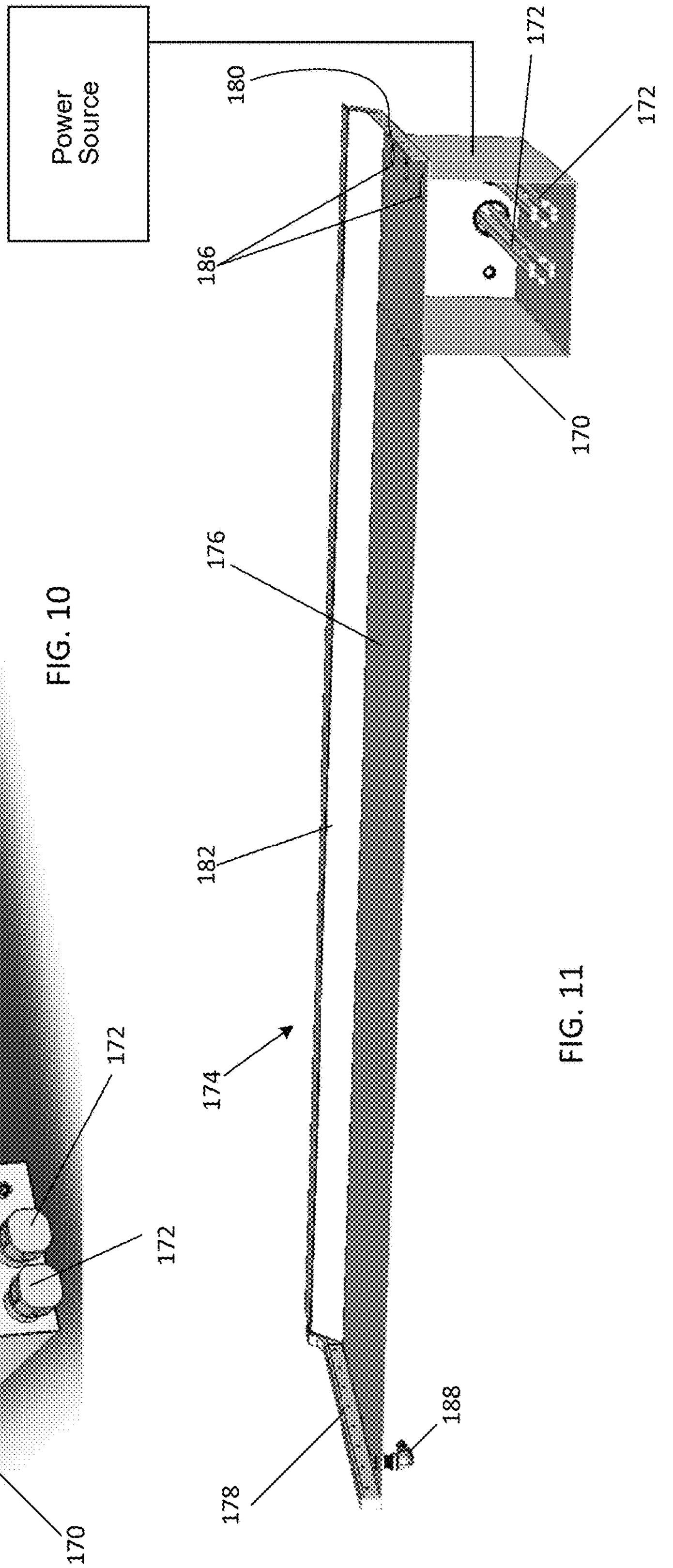
FIG. 11 is a cross-sectional perspective view of the table section of FIG. 10.
Figure 12:
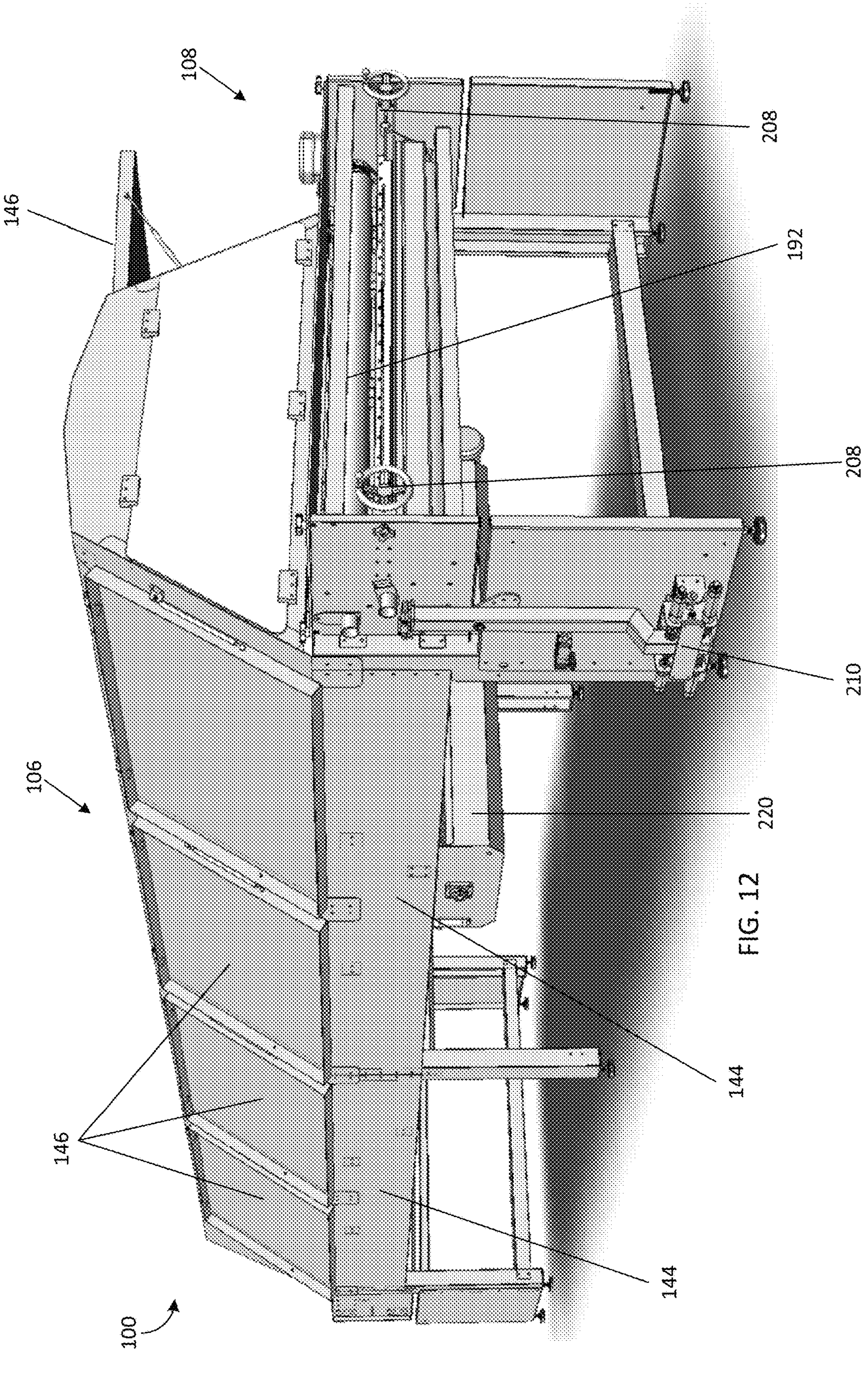
FIG. 12 is another perspective view of the drying apparatus of FIG. 1.

Referring now to FIGS. 9-11, each table section 144 can comprise a holding tank 170 (FIG. 10), one or more temperature control elements 172, and a basin or water table 174 configured to hold a layer of water. As best seen in FIG. 10, the water table 174 can comprise an elongated base portion 176, a first end wall configured as a diffuser bar 178, a second end wall 180 (FIG. 11), and first and second side walls 182.

Generally, heated water can be pumped from the holding tank 170 onto the water table 174 via the diffuser bar 178 and can drain from the water table 174 back into the holding tank 170 to be reheated, creating a continuous cycle.

The diffuser bar 178 can be an elongated member comprising a plurality of apertures or openings 184 spaced apart from one another along a length of the diffuser bar 178. The diffuser bar 178 can further comprise an inlet or valve 188 (FIG. 11) that can be removably coupled to the holding tank 170 via one or more pumps. Water can be pumped from the holding tank 170 into the diffuser bar 178 and can exit the diffuser bar 178 onto the base portion 176 via the openings 184. The diffuser bar 178 of each table section 144 can be disposed nearer the wet end portion 102 of the drying apparatus 100.The base portion 176 can comprise one or more drain openings 186 extending through a thickness of the base portion 176. The drain openings 186 can be aligned with the holding tank 170 such that water flowing through the drain openings flows into the holding tank 170, where it can be heated and/or cooled by the one or more temperature control elements 172.

The holding tank 170 can comprise one or more temperature control elements 172 extending at least partially into the holding tank 170. In some embodiments, the temperature control elements 172 can be electric immersion heaters, immersion style steam heat exchangers, or a combination of the two. Each temperature control element 172 can operatively coupled to a power source, for example, an electrical power source. In some embodiments, the power source can comprise one or more solar panels. In some embodiments, in lieu of or in addition to the temperature control elements 172, the drying apparatus 100 can comprise a boiler or other gas-powered heating system configured to heat the water which can then be pumped to the water table 174.

In the illustrated embodiment, each holding tank 170 comprises two temperature control elements 172. However, in other embodiments, each holding tank 170 can comprise any number of temperature control elements, such as one, three, four, five, or six temperature control elements 172.

The configuration of the table sections 144 advantageously reduces the amount of water necessary per table section 144. In some conventional drying apparatuses, the water requirement per section can be about 119 gallons. However, in the disclosed embodiments, the water requirement is about 76 gallons per table, a 36% reduction. Drying apparatuses are typically drained weekly to ensure water quality, accordingly, the disclosed embodiments can advantageously save 258 gallons of water per week when compared to other conventional drying apparatuses. The holding tank 170 further provides a smaller heating area, which can advantageously reduce energy costs and further allows for easier cleaning due to the reduced profile of the tank 170 under the drying apparatus 100.

Each table section 144 can be controlled via the control unit and can operate independently of the other table sections 144 such that each table section 144 can heat the water to a respective selected temperature. In some embodiments, each table section 144 may be set to a selected temperature different from the adjacent table section(s). For example, in an embodiment having six table sections 144, the first table section (adjacent the wet end portion 102) can have a selected temperature of about 180 degrees, the second table section can have a selected temperature of about 170 degrees, the third table section can have a selected temperature of about 160 degrees, the fourth table section can have a selected temperature of about 150 degrees, the fifth table section can have a selected temperature of about 145 degrees, and the sixth table section (adjacent the dry end portion 108) can have a selected temperature of about 140 degrees. In other embodiments, one or more table sections 144 can have the same selected temperature.

In some embodiments, one or more of the temperature control units 172 can be, for example, refrigeration units. In such embodiments, the temperature control units 172 can be configured to cool the water to lower a temperature of the product puree. For example, an ending table section 144 (e.g., disposed adjacent the dry end portion 108) of the drying apparatus 100 can be configured to lower the temperature of the product, which can advantageously facilitate removal of the dry product from the belt 104. In such embodiments, the water can include one or more antifreeze agents, such as glycol, to prevent the water from freezing.

As shown in FIG. 9, a wall or dam 190 can be positioned between each pair of adjacent table sections 144 to prevent water from flowing from one table section 144 to another. The dam 190 can comprise, for example, ultra-high molecular-weight polyethylene (UHMW), and can be sized to abut the inner surface 130 of the belt 104.

In some embodiments, adjacent table sections 144 can be removably coupled together (e.g., using screws or other mechanical means such as clamps, clasps, etc.) such that the drying apparatus 100 is a modular drying apparatus the length of which can be adjusted as necessary depending on the selected product to be dried. In other embodiments, adjacent table sections 144 can be permanently coupled together (e.g., using welding or other means).

Figure 20:
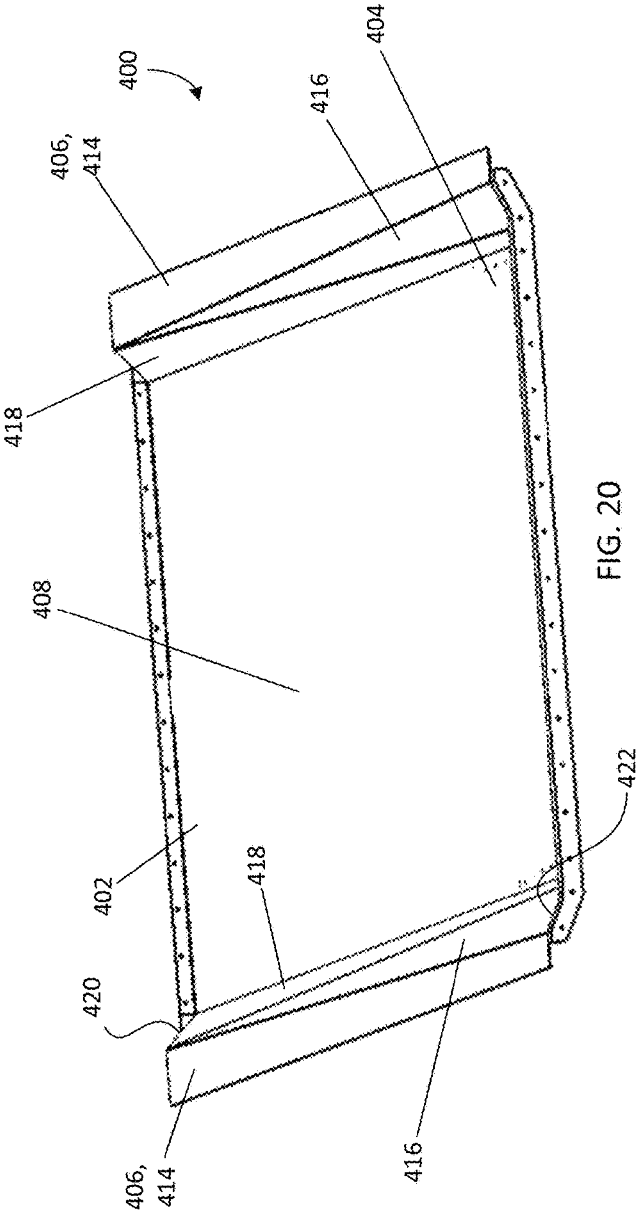
FIG. 20 is a perspective view of a table section of a drying apparatus, according to one embodiment.
Figure 21:
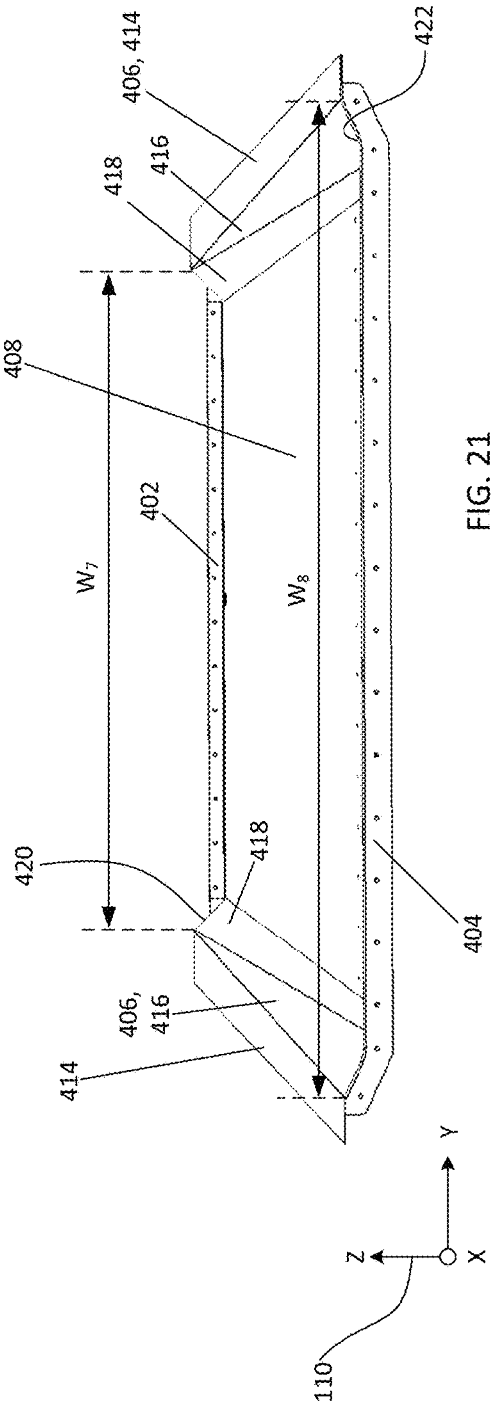
FIG. 21 is a perspective view of the table section of FIG. 20.
Figure 22:
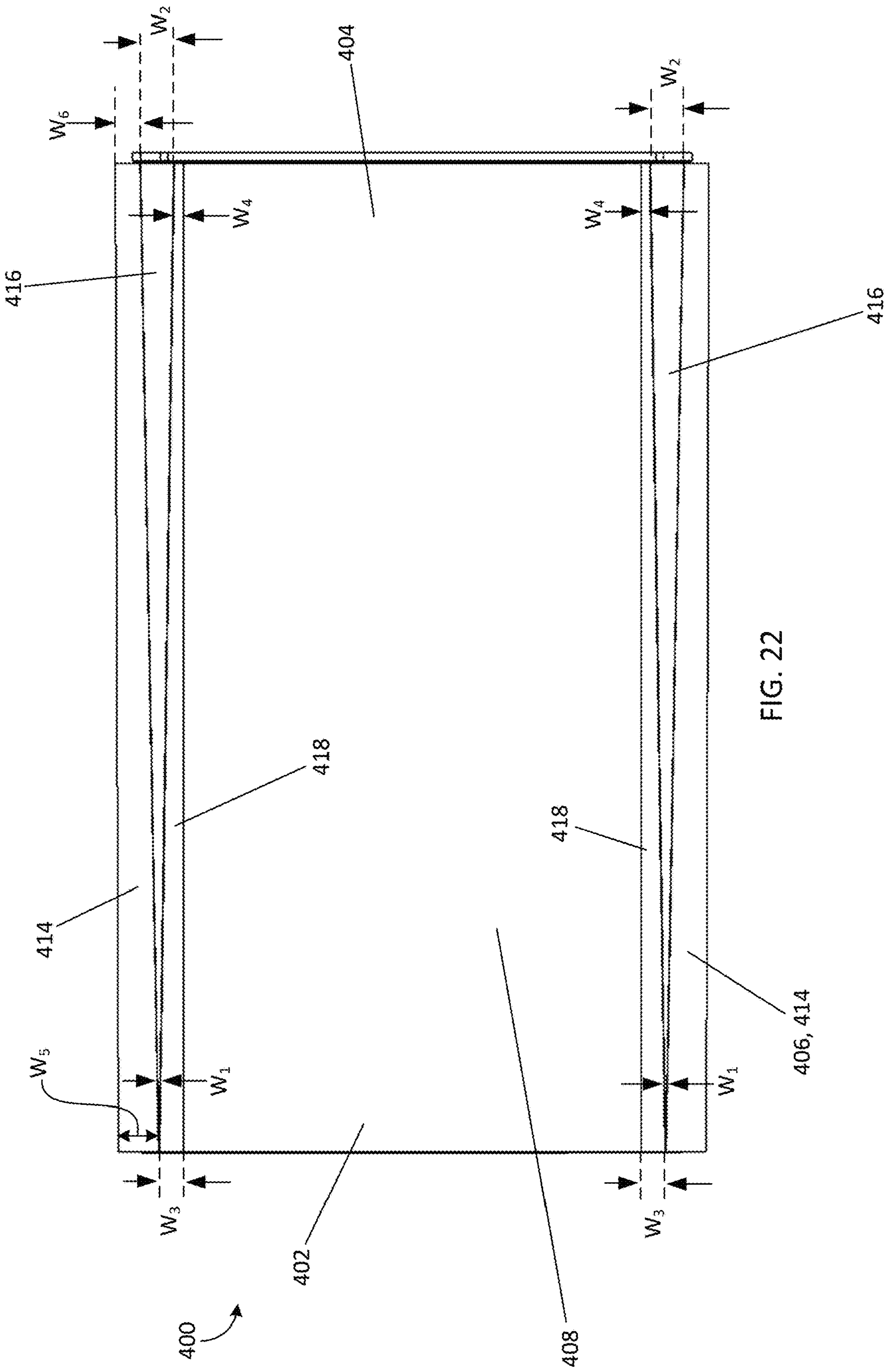
FIG. 22 is a top plan view of the table section of FIG. 20.

Referring to FIGS. 20-22, in some embodiments, the drying chamber 106 can comprise one or more angled table sections 400. The angled table sections 400 can be used in lieu of or in addition to table sections 144. For example, the angled table sections 400 can be disposed adjacent the wet end portion 102 and the dry end portion 108. As shown in FIG. 20, similar to table sections 144, the angled table sections 400 can comprise a first end portion 402, a second end portion 404, two side walls 406, and a table portion or water table 408. The angled table sections 400 can include the same features described previously for the table sections 144, such as a holding tank, one or more temperature control elements, a diffuser bar, one or more drain openings, etc.

Each side wall 406 comprises a flat portion 414 and first and second angled portions 416, 418. As shown in FIG. 22, the first angled portion 416 can taper from a first width $W_1$ at the first end portion 402 to a second, greater width $W_2$ at the second end portion 404, and the second angled portion can taper from a first width $W_3$ at the first end portion 402 to a second, narrower width $W_4$ at the second end portion 404. As shown in FIG. 21, the flat portions 414 extend laterally outward (e.g., along the Y-axis as shown by coordinate system 110) from a longitudinal axis of the table section 400 (e.g., the X-axis as shown by coordinate system 110). Referring again to FIG. 22, the flat portions 414 can taper from a first width $W_5$ at the first end portion 402 to a second, narrower width $W_6$ at the second end portion 404.

As shown in FIG. 21, the intersection of the angled portions 416, 418 and the flat portions 414 defines a first opening 420 the first end portion 402 and a second opening 422 at the second end portion 404. The first opening 420 can have a width $W_7$, and the second opening 422 can have a width $W_8$ greater than the width $W_7$ of the first opening. Accordingly, the first end portion 402 can be referred to as the narrow end portion and the second end portion 404 can be referred to as the wide end portion. The width $W_7$ of the first opening 420 can be substantially equal to the width of the belt 104 such that the deposition on the belt 104 of water disposed on the table portion 408 of the angled table section 400 is reduced or prevented. The second opening 422 can have a width greater than the width of the belt 104 to allow the belt 104 to lay flat and to prevent or mitigate belt creasing.

In some embodiments, the drying apparatus 100 can comprise a first angled table section 400 positioned adjacent the wet end portion 102 and a second angled table section 400 positioned adjacent the dry end portion 108. One or more table sections 144 can be positioned between and coupled to the first and second angled table sections 400 to form a base portion of the drying chamber 106. The second or wide end portion 404 of each angled table section 400 can be positioned such that it is adjacent to a roller. For example, the second end portion 404 of the first angled table section 400 can be positioned adjacent a roller 118 of the wet end portion 102, and the second end portion 404 of the second angled table section 400 can be positioned adjacent a roller 192 of the dry end portion 108.

In use, the belt 104 can pass from roller 118 of the wet end portion 102 onto the second, wider end portion 404 of the first angled table portion 400 and through the first end portion 402, travel through the drying chamber 106, and onto the second angled table portion 400 through the first end portion 404. The belt can then pass from the second end portion 404 onto roller 192 of the dry end portion 108. Such a configuration advantageously allows the belt 104 to move off of roller 118 onto a wide end portion 404 and off of a wide end portion 404 onto roller 192, thereby mitigating or preventing creasing of the roller belt 104.

In other embodiments, the first and/or second angled table portions can be positioned such that the first end portion 402 is adjacent the wet and/or dry end, respectively. In still other embodiments, any number of table sections can be configured as angled table sections 400. For example, in some embodiments, all table sections in a drying apparatus 100 can be configured as angled table portions 400.

Referring to FIGS. 12-15, as mentioned previously, the drying apparatus 100 can comprise a dry end portion 108. As the product puree moves through the drying chamber 106, water is removed from the puree until a selected level of desiccation is reached, resulting in a "dry product" (e.g., a product having less than a selected level of hydration). The dry product can then be removed from the belt 104 at the dry end portion 108.

Figure 13:
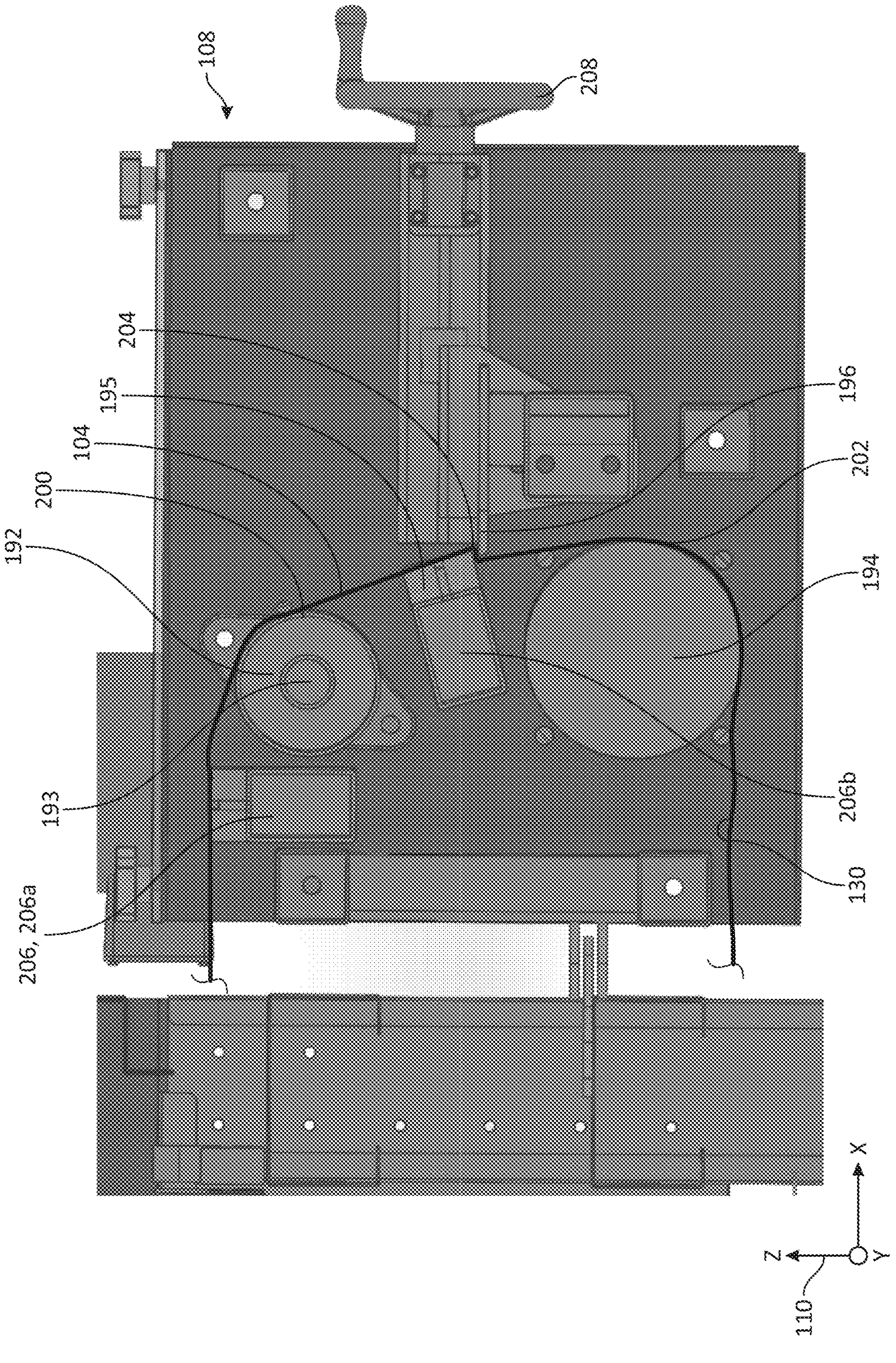
FIG. 13 is a cross-sectional side elevational view of a portion of the dry end portion of the drying apparatus of FIG. 1.
Figure 15:
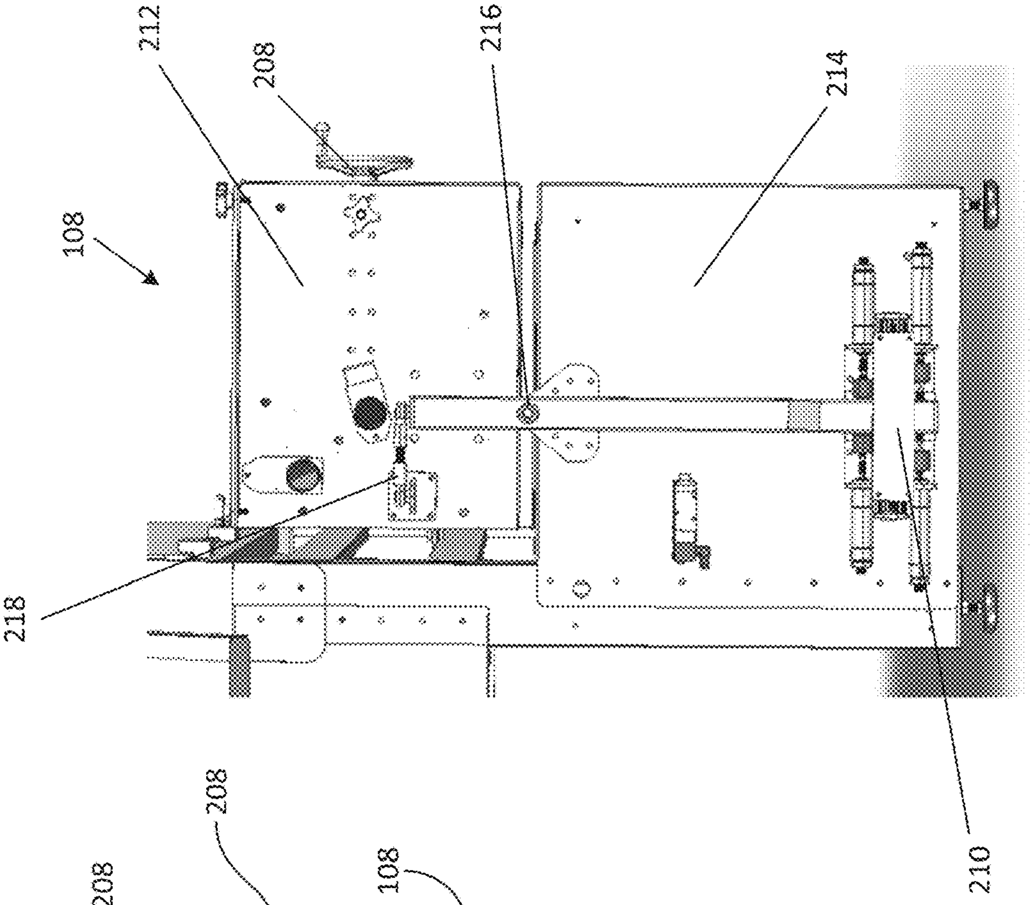
FIG. 15 is a side elevational view of the dry end portion of the drying apparatus of FIG. 1.

Referring to FIG. 13, the dry end portion 108 can comprise a first roller 192, a second roller configured as a drive roller 194, a bull nose 195, and a scraper or knife 196. The first roller 192 can be offset from the drive roller 194 toward the drying chamber 106 (e.g., in the X-direction as shown by coordinate system 110) such that a leading edge 200 of the first roller 192 is positioned at an angle relative to a leading edge 202 of the drive roller 194. In some particular embodiments, the leading edge 200 of the first roller 192 can be positioned at about a 13 degree angle relative to the leading edge 202 of the drive roller 194. This configuration advantageously allows the belt 104 to have increased contact with the drive roller 194, which can prevent or mitigate slippage of the belt 104 relative to the driver roller. In some embodiments, the outer surface of the drive roller 194 can comprise a food grade silicon rubber compound that helps the drive roller 194 grip the belt 104.

As shown in FIG. 13, the belt 104 can pass over the first roller 192 between the bullnose 195 and knife 196 and under the drive roller 194. The bullnose 195 can be positioned above the knife 196 in the Z-direction (e.g., as shown by coordinate system 110), and can be angled such that a bottom surface of the bullnose 195 is disposed at about a 15 degree angle relative to the knife 196. The bullnose 195 can comprise, for example, ultra-high molecular weight (UHMW) plastic, and the knife 196 can be, for example, stainless steel, such as 303 stainless steel.

As the belt 104 passes between the bullnose 195 and the knife 196, the positioning of the bullnose 195 and knife 196 relative to one another cause the belt 104 to form a Z-bend 204. In some embodiments, the Z-bend can have an angle between about 45 degrees and about 60 degrees. In some particular embodiments, the Z-bend can have an angle of about 60 degrees or greater. The Z-bend configuration advantageously allows the knife 196 to release the dry product from the belt 104 while preventing or mitigating damage to the belt 104. The dry product can then be collected and removed from the drying apparatus 100. For example, in conventional drying devices belts are often required to be replaced after 72 hours operation (e.g., due to damage and/or wear). However, the disclosed drying apparatus 100 can advantageously operate for at least 480 hours before belt replacement is needed.

Figure 16:
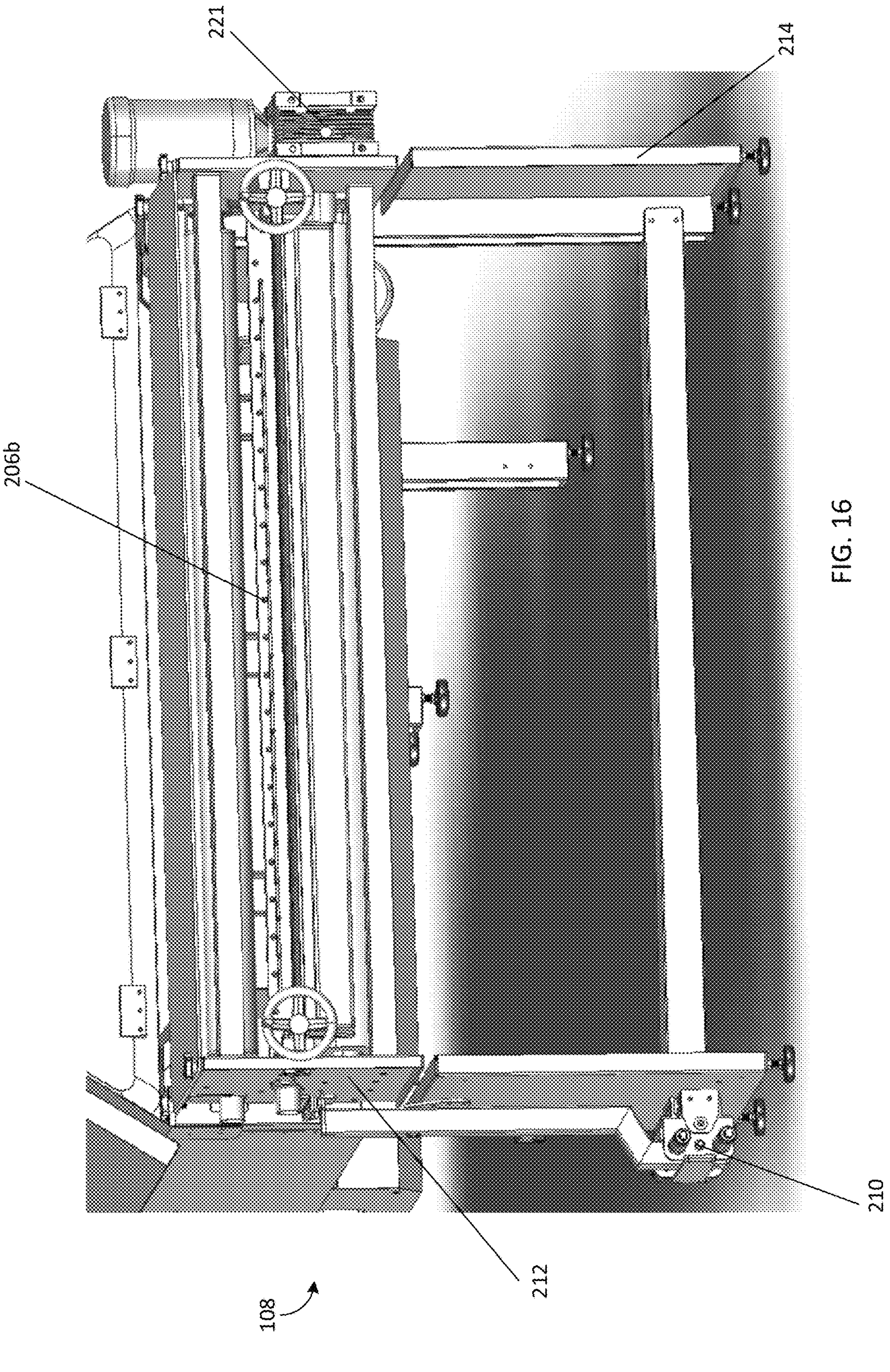
FIG. 16 is another perspective view of the dry end portion of the drying apparatus of FIG. 1.
Figure 18:
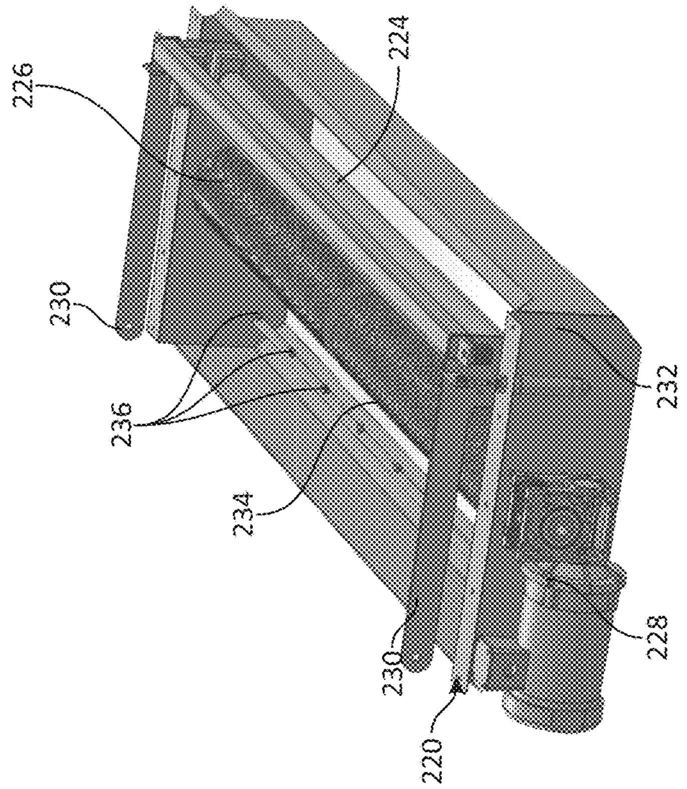
FIG. 18 is another perspective view of the brush device of FIG. 17.

The dry end portion 108 can further comprise one or more vacuum heads 206 configured to keep the belt 104 taut and maintain the contact of the belt 104 with the rollers 192, 194. For example, in the illustrated embodiment, the dry end portion 108 comprises a first vacuum head 206*a* and a second vacuum head 206*b*. The second vacuum head 206*b* can be coupled to the bullnose 195 and can be configured to help keep the belt 104 in contact with the bullnose 195. As shown in FIG. 16, the vacuum head 206*b* can be configured as an elongated member having a plurality of vacuum openings along its length. This configuration advantageously helps the bullnose 195 remove water from the inner surface 130 of the belt 104. The one or more vacuum heads 206 can be configured as wet vacuum heads and can be coupled to a wet vacuum system.

In some embodiments, one or more of the rollers 192, 194 can be configured as chilled rollers. A chilled roller is a roller that has a temperature below the wet product temperature. The chilled temperature of the roller can be accomplished by filling the roller with a cool substance. For example, in the illustrated embodiment, roller 192 can be a glycol chilled roller. The roller shaft 193 can be coupled to one or more rotating joints that allow chilled glycol to fill the inner volume of the roller 192. Such a configuration can advantageously aid in the removal of dry product from the belt 104. For example, products that have a high sugar contact can be rapidly cooled using the glycol chilled roller 192, decreasing the adherence of the product to the belt (e.g., decreasing the stickiness of the product) and causing the product to become more brittle and thus more easily removed from the belt 104. In other embodiments, the chilled roller temperature may be controlled with other fluids, such as air.

Referring again to FIG. 13, the dry end portion 108 can further comprise one or more adjustment devices 208 configured to adjust the position of, for example, the knife 196. For example, in the illustrated embodiment, the adjustment device 208 is configured to adjust the position of the knife 196 relative to the bullnose 195 (e.g., in the X-direction and/or the Z-direction). This configuration can advantageously allow a user to adjust the angle of the Z-bend 204 depending on the thickness of the belt 104 and/or the specific product being dried. In other embodiments, additional adjustment devices can control the position of the bullnose 195, and/or the rollers 192, 194.

The drying apparatus 100 can further comprise one or more belt sensors configured to track the position of the belt 104. The belt sensors can be positioned at the wet end portion 102, the dry end portion 108, and/or at any position along the length of the drying apparatus 100. The belt sensors can be operatively coupled to the control unit which can be operatively coupled to one or more steering units 210 mounted on the wet end portion 102 and/or dry end portion 108 of the drying apparatus 100.

In the illustrated embodiment, the drying apparatus 100 comprises a steering unit 210 disposed on the dry end portion 108 of the apparatus. The steering unit 210 can be configured to receive a tracking command (e.g., "right" or "left") from the control unit and to turn a portion of the dry end portion 108 based on the command to correct the position of the belt 104. In some embodiments, the wet end portion 102 can also comprise a steering unit 210. In such embodiments, the wet end portion 102 and dry end portion 108 can steer simultaneously.

In some embodiments, as shown in FIG. 16, the belt 104 can be driven by an electric gear motor 221 coupled to the drive roller 194 at the dry end portion 108. The belt speed can be controlled via a frequency drive operatively coupled to the electric gear motor 221. The frequency drive can control the speed of the electric gear motor (and thereby the drive roller 194) and can be controlled by the control unit.

Figure 14:
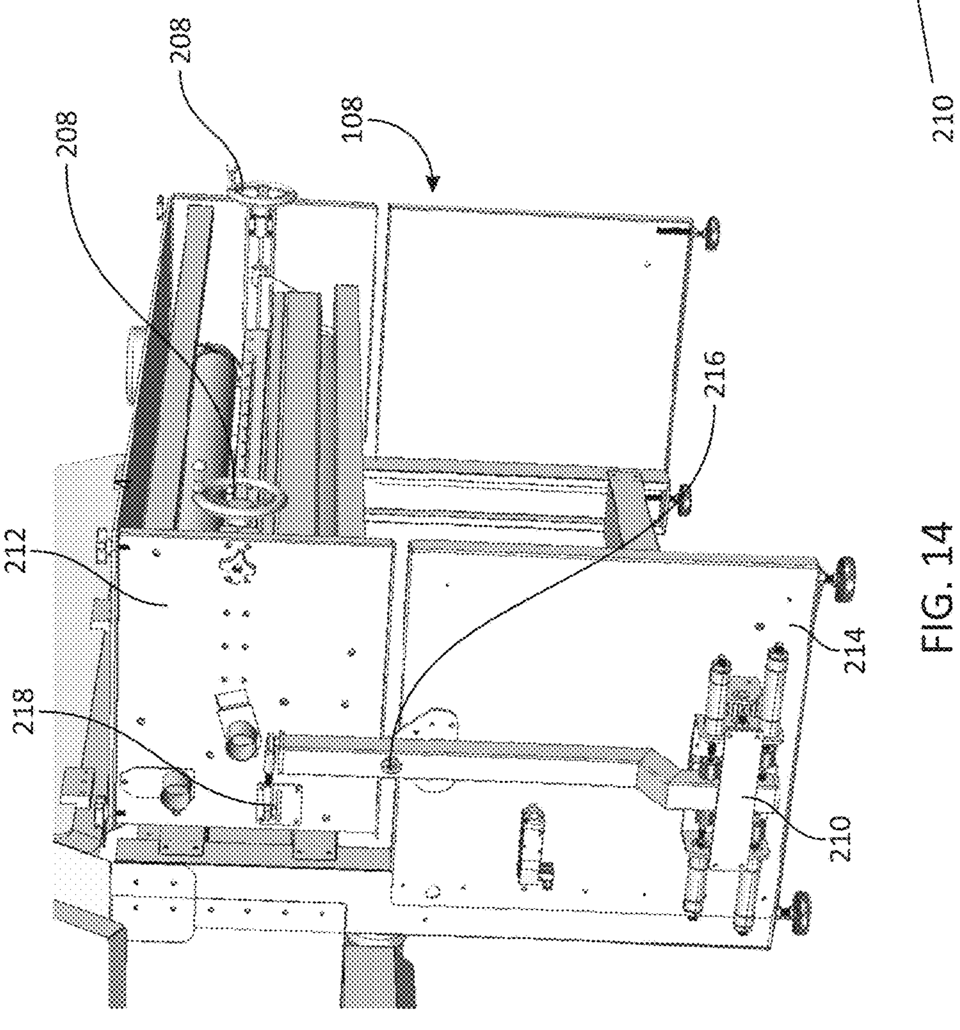
FIG. 14 is a perspective view of the dry end portion of the drying apparatus of FIG. 1.

As shown in FIG. 14, the dry end portion 108 can comprise an upper housing 212 and a lower housing 214. The upper housing 212 can be pivotably coupled to the lower housing 214 via steering unit 210 at a pivot point 216. The steering unit 210 can comprise one or more air cylinders 218 configured to actuate to pivot the upper housing 212. The steering unit 210 can have a default or center position, in which the upper housing 212 is not pivoted relative to the lower housing 214. When a belt sensor determines that the belt 104 is not correctly centered, the belt sensor transmits the information to the control unit, which activates the steering unit 210 to pivot the upper housing 212 (e.g., by actuating one or more air cylinders 218). Once the belt 104 has returned to a selected position, the control unit can receive input from the belt sensors indicating that the belt 104 is in the selected position, and the control unit can actuate the steering unit 210 to return to the center position. This configuration can advantageously prevent or mitigate the belt 104 from becoming displaced or "wandering" to one side or the other of the drying apparatus 100, which can result in fraying or tearing of the belt 104.

Figure 17:
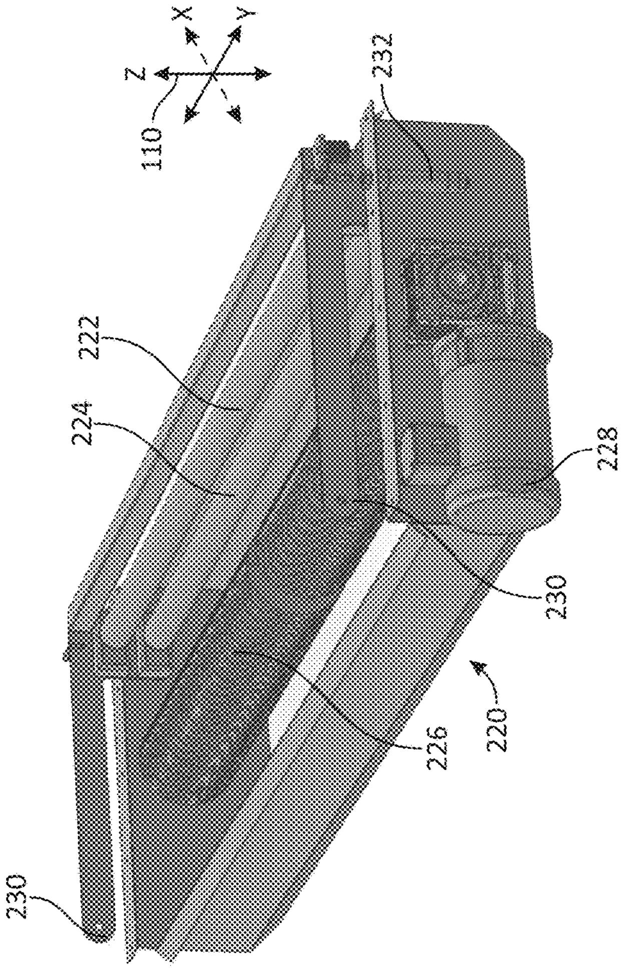
FIG. 17 is a perspective view of a brush device of a drying apparatus, according to one embodiment.

In the illustrated embodiment (see e.g., FIG. 1), the drying apparatus 100 can further comprise one or more brush devices 220 configured to selectively clean remaining dry product off the outer surface 128 of the belt 104. Referring to FIGS. 16-17, each brush device 220 can comprise a first roller 222 and a second roller 224, a brush 226 (e.g., a nylon bristle brush), and a motor 228 (e.g., right angle gear motor) operatively coupled to the brush 226. The brush device 220 can be movable between an engaged position (in which the brush 226 contacts the belt 104) and a disengaged position (in which the brush 226 does not contact the belt 104). The operation of each brush device 220 can be controlled via the control unit. Though the illustrated embodiment shows a single brush device 220, in other embodiments the drying apparatus can comprise two, three, four, etc. brush devices.

As shown in FIG. 17, the first roller 222 can be spaced apart from the second roller 224 in the Z-direction (see e.g., coordinate system 110). In some embodiments, the first roller 222 can be positioned directly above the second roller 224, and in other embodiments, the first roller 222 can be offset from the second roller 224 in the X-direction. The belt 104 can pass between the first and second rollers 222, 224 and over the brush 226. When the brush device 220 is in the engaged position, the first roller 222 can be configured to push the belt 104 against the brush 226 such that the brush 226 can remove remaining dry product from the belt 104. When the brush device 220 is in the disengaged position, the second roller 224 can push the belt 104 away from the brush 226 such that the brush 226 does not contact the belt 104.

The brush device 220 can be pivotably coupled to the drying apparatus 100 via pivot members 230. The first and second rollers 222, 224 can be moved (e.g., in the Z-direction) relative to the brush 226 via one or more air cylinders 232. Air pressure to the air cylinders 232 can be controlled via, for example, a regulator, which can thereby control the tension of the belt 104 against the brush 226.

Each brush device 220 can further comprise one or more spray bars 234 (see e.g., FIG. 17). Each spray bar 234 can be an elongated bar comprising one or more openings and/or spray nozzles 236 and configured to spray water onto the belt 104 and/or brush 226. The flow of water can help loosen and/or remove remaining dry product from the belt 104 and/or brush 226. The spray bar 234 can be controlled via the control unit which can control the flow of water to the spray bar 234.

Water sprayed by the spray bar 234, referred to hereinafter as "rinse water" can flow from the brush device 226 into a trough or catch basin positioned beneath the brush device 220. A pump can be coupled to the catch basin via a drain valve to pump the rinse water to, for example, a drain. The catch basin can comprise an additional spray bar configured to be used during cleaning and/or disinfecting of the catch basin. An air operated diaphragm pump can be coupled to the catch basin and can be configured to supply cleaning and/or disinfecting fluid to the spray bar within the catch basin.

During cleaning and/or disinfecting of the drying apparatus 100, the drain valve in the catch basin can be closed and the catch basin can be filled with cleaning and/or disinfecting solution. The diaphragm pump can then pump the cleaning and/or disinfecting solution through the brush device 220 sprayer bar 234 onto the belt 104 and/or brush 226.

In some embodiments, cleaning and/or disinfecting of the drying apparatus 100 can be configured as a manual process (e.g., rather than one controlled by the control unit). Such embodiments can advantageously mitigate the chances of cleaning materials contaminating product puree and/or dry product.

In some embodiments, the drying apparatus 100 can be contained within an environmentally controlled room or chamber. The chamber can encase the entire drying apparatus 100 such that humidity, temperature, and/or air quality within the chamber and/or drying apparatus 100 itself can be controlled. In such embodiments, rather than supplying the drying apparatus 100 with atmospheric air that has been filtered, the chamber can comprise a self-contained air handling system.

In some embodiments, the chamber can comprise a plurality of foam-insulated, Good Manufacturing Practices (GMP) certified panels. Some of the panels can be, for example 4 inch thick panels having a width of 4 feet and a height of 8 feet. One or more panels (e.g., the roof panels) can be 4 feet wide, 16 feet long, 4 inches thick, and can span 16 feet without needing additional support in the middle portion of the panel. The panels can be configured to support the weight of, for example, HVAC equipment, without bending or buckling. The panels can be insulated such that temperature and humidity can be controlled within the chamber. The chamber can be sized such that one or more workers can enter the chamber with the drying apparatus 100.

As mentioned previously, the drying apparatus 100 can comprise a control unit configured to control various components of the drying apparatus. In some embodiments, the drying apparatus 100 can comprise a display unit configured to allow a user to access the control unit. The display unit can allow a user to input instructions and/or information to the control unit and/or can display information relating to the drying process. The control unit can further be configured to receive data from and/or transmit data to a remote device. For example, the remote device can be configured to store data from, transmit data to, and/or remotely control the drying apparatus 100. The remote device can be, for example, a general-purpose computer, a hand-held mobile device (e.g., a cell phone or tablet), and/or any type of accessory therefore (e.g., a "smart watch" etc.).

Figure 19:
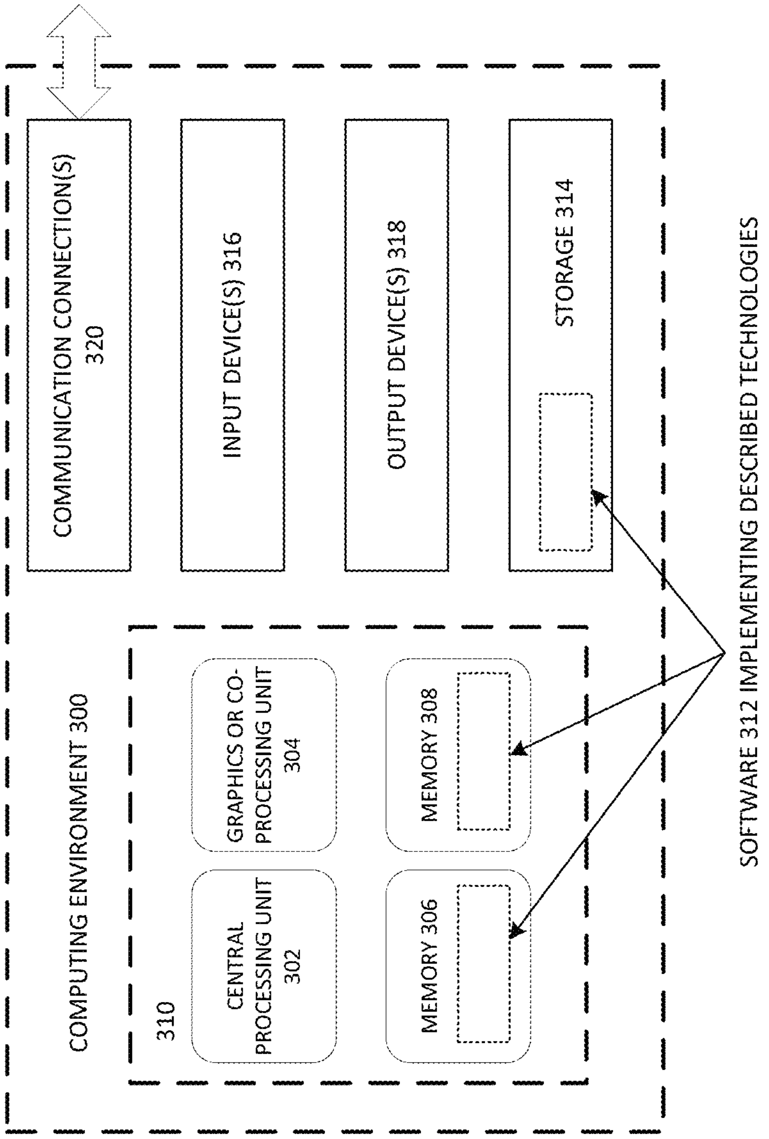
FIG. 19 is a representative diagram of an exemplary computing environment.

The following is a general description of a computing environment suitable for use with the disclosed control unit. FIG. 19 depicts a generalized example of a suitable computing environment 300 in which software and control algorithms for the described innovations may be implemented. The computing environment 300 is not intended to suggest any limitation as to scope of use or functionality, as the innovations may be implemented in diverse general-purpose or special-purpose computing systems. For example, the computing environment 300 can be any of a variety of computing devices (e.g., desktop computer, laptop computer, server computer, tablet computer, gaming system, mobile device, programmable automation controller, etc.).

With reference to FIG. 19, the computing environment 300 includes one or more processing units 302, 304 and memory 306, 308 (e.g., for storing sequence data and/or system input data). In FIG. 19, this basic configuration 310 is included within a dashed line. The processing units 302, 304 execute computer executable instructions. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 19 shows a central processing unit 302 as well as a graphics processing unit 304. The tangible memory 306, 308 can be volatile memory (e.g., registers, cache, RAM), non-volatile memory (e.g., ROM, EEPROM, flash memory, etc.) or some combination of the two, accessible by the processing unit(s). The memory 306, 308 stores software 312 implementing one or more innovations described herein, in the form of computer-executable instructions suitable for execution by the processing unit(s).

A computing system may have additional features. For example, in some embodiments, the computing environment 300 includes storage 314, one or more input devices 316, one or more output devices 318, and one or more communication connections 320. An interconnection mechanism (not shown) such as a bus, controller, or network, interconnects the components of the computing environment 300. Typically, operating system software (not shown) provides an operating environment for other software executing in the computing environment 300, and coordinates activities of the components of the computing environment 300. In some embodiments, the computing system can include virtual network computing (VNC) functionality configured to allow operators to access the control unit 126 and computing environment 300 from a remote location. For example, the computing environment 300 can have remote dial-in capability. The VNC functionality can allow an operator to remotely access the computing environment in order to, for example, perform maintenance or live monitoring of the administration device 100, or to train an operator on the use of the administration device 100.

The tangible storage 314 may be removable or non-removable, and includes magnetic disks, magnetic tapes or cassettes, CD-ROMs, DVDs, or any other medium that can be used to store information in a non-transitory way and can be accessed within the computing environment 300. The storage 314 stores instructions for the software 312 implementing one or more innovations described herein (e.g., for storing sequence data, temperature data, template type data, location, date, etc.). In some embodiments, the storage can be a "cloud-based" system configured to store data, allow access to data, and/or generate reports. For example, data logs can be sent to a cloud system and reports can be generated therefrom. Users (including, for example, clients) can access the cloud system remotely through using selected log-in credentials.

The input device(s) 316 can be, for example: a touch input device, such as a touchscreen display, keyboard, mouse, pen, or trackball; a voice input device; a scanning device; any of various sensors (e.g., the quantity indicator, speed indicator, location unit, etc.); another device that provides input to the computing environment; or combinations thereof. The input device(s) can be remote from the control unit. The output device(s) 318 can be a display, printer, speaker, CD-writer, transmitter, or another device that provides output from the computing environment 300.

The communication connection(s) 320 enable communication over a communication medium to another computing entity. For example, the communication connection(s) can enable communication between the control unit 126 and a remote input device, for example, a phone app, or a computer browser. The communication medium conveys information, such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, Wi-Fi, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communications means include, for example, the Internet, an intranet, software applications, cable (including fiber optic cable), magnetic communications, electromagnetic communications (including RF, microwave, and infrared communications), electronic communications, or other such communication means.

As mentioned previously, the control unit can include a display configured to allow a user to input commands to the control unit, control the drying process, and/or track information relating to the drying process. In some embodiments, the control unit can display real-time information on the display. In some embodiments, such as those wherein the control unit transmits information to a remote device, the remote device can comprise a display configured to allow a user to input commands to the control unit, control the drying process, and/or track information relating to the drying process.

The display can be configured to display a graphical user interface (GUI) comprising one or more data outputs (e.g., temperature, humidity, belt speed, product type, etc.) from the drying apparatus 100. In some embodiments, the display can be a touchscreen display/UI and is configured to accept user input(s) via the touchscreen.

Referring to FIGS. 23-26, in some embodiments, in lieu of or addition to spray apparatus 122, the drying apparatus

100 can comprise spray apparatus 500, which is configured to spray puree onto a portion of the outer surface 128 of the belt 104. Similarly to spray apparatus 122, spray apparatus 500 can comprise one or more inlets 502 (similar to inlets 136) configured to be coupled to one or more pumps, and one or more adjustable couplings 504 similar to adjustable couplings 138 described previously. The pumps can be coupled to puree containers and/or troughs containing wet product.

Spray apparatus 500 can comprise a first or outer member 506 (shown translucently in FIGS. 24-25 for purposes of illustration; also referred to as a first elongated member or bar) and a second or inner member 508 (FIG. 24), also referred to as a second elongated member or baffle. In the illustrated embodiment, the first and second members 506, 508 can be configured as elongated cylinders or tubes. However, in other embodiments they can have any of various shapes. As best seen in FIG. 26, the outer member 506 can comprise an inner lumen or bore 510 and the inner member 508 can comprise an interior lumen or bore 512. As shown, the inner member 508 can be disposed within the inner bore 510 of the outer member 506. In the illustrated embodiment, the inner member 508 is disposed concentrically within the outer member 506, however, in other embodiments, the inner member 508 may be offset from a longitudinal axis of the outer member 506.

Figure 23:
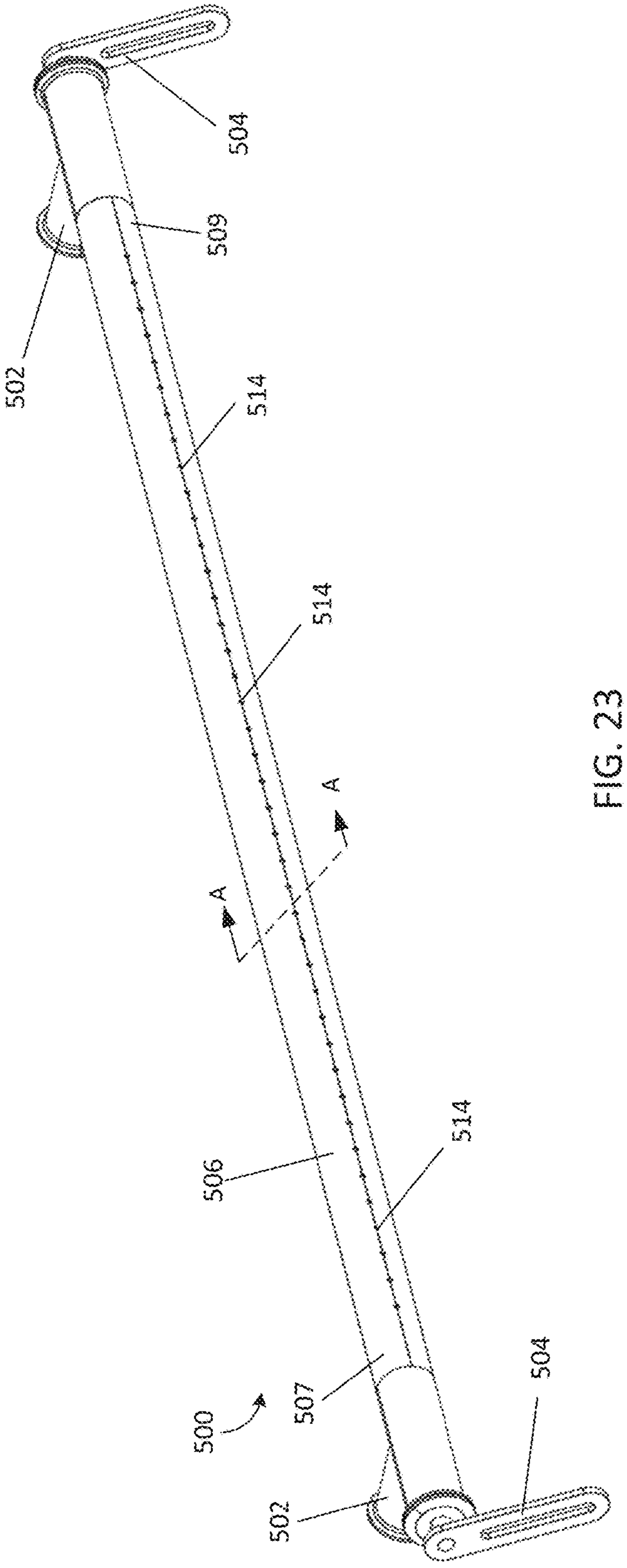
FIG. 23 is a perspective view of an exemplary embodiment of a spray apparatus.
Figure 24:
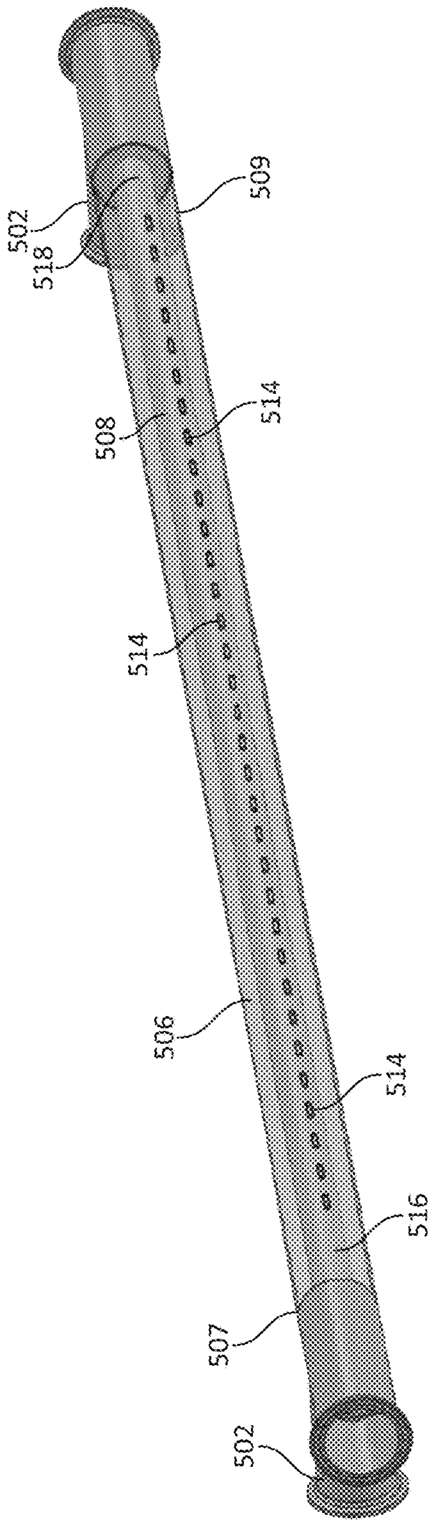
FIG. 24 is a perspective view of another exemplary embodiment of a spray apparatus, with the outer member shown translucently for purposes of illustration.

Referring to FIG. 23, the outer member 506 can comprise a first end portion 507, a second end portion 509, and a plurality of channels 514 disposed along the length of the outer member and oriented toward the outer surface 128 of the belt 104. The channels 514 can extend through a thickness of the outer member 506 and be fluidly connected to the inner bore 510. Each channel can comprise a first opening at a first end portion (e.g., at a radially outer surface of the outer member 506) and a second opening at a second end portion (e.g., at a radially inner surface of the outer member 506). The openings can have any of various shapes, for example, circular, square, square-oval, triangular, rectangular, etc. For example, FIG. 23 illustrates an embodiment wherein the openings at either end of each channel 514 have a circular shape. Such a configuration can be used with thinner products that naturally create a relatively even coating layer when applied to the belt 104. FIG. 24 illustrates an embodiment wherein the openings of each channel 514 have a square-oval or pill shape. Such a configuration can be used with thicker products to prevent or mitigate striping on the belt 104 and to help provide a more even coating layer.

In some embodiments, channels 514 can be similar to channels 134 described previously. That is, channels 514 can be configured to spray product puree onto the belt 104 in a fan-type pattern. For example, each channel 514 can have a first width at a radially inner surface of the outer member 506 and a second width at a radially outer surface of the outer member 506. The second width can be greater than the first width such that the channel 514 flares outwardly as it extends through the thickness of the outer member 506. Such a configuration allows the puree to spray out of the outer member 506 in a fan-type pattern. In other embodiments, the channels 514 can have openings of the same width at either end.

Figure 25:
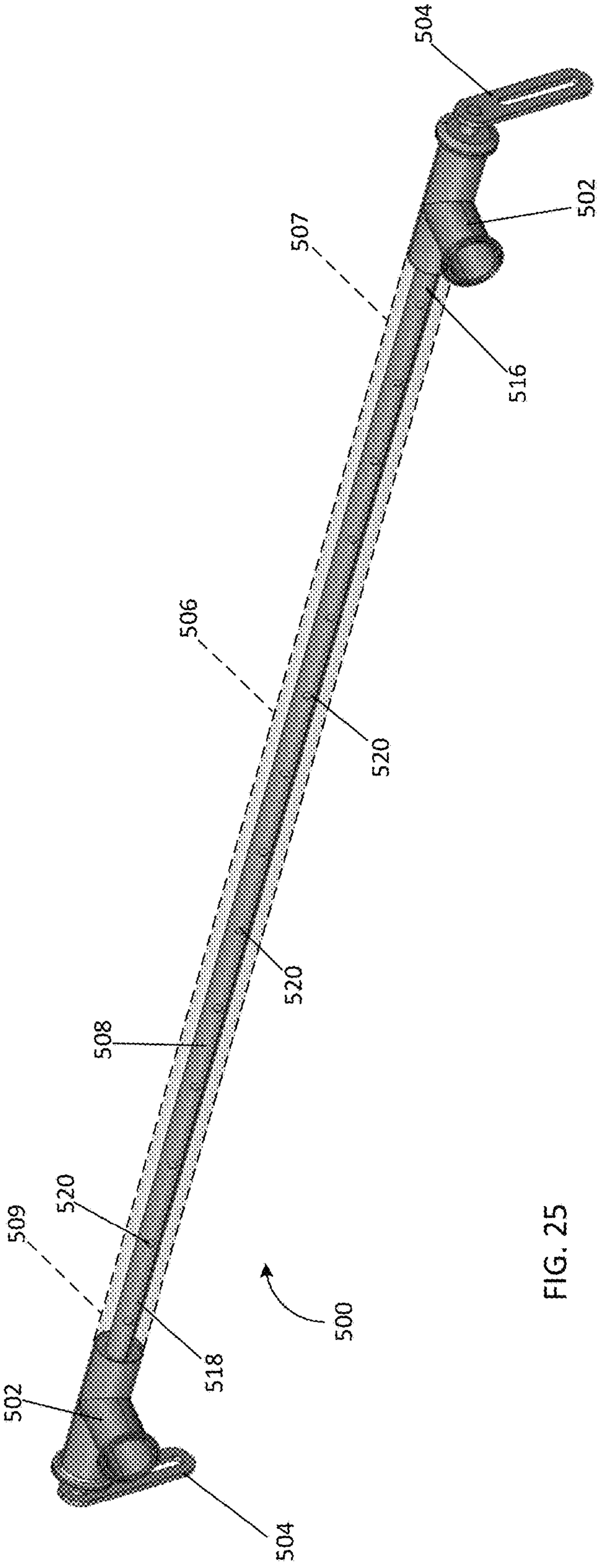
FIG. 25 is a perspective view of the spray apparatus of FIG. 23, with the outer member shown translucently for purposes of illustration.
Figure 26:
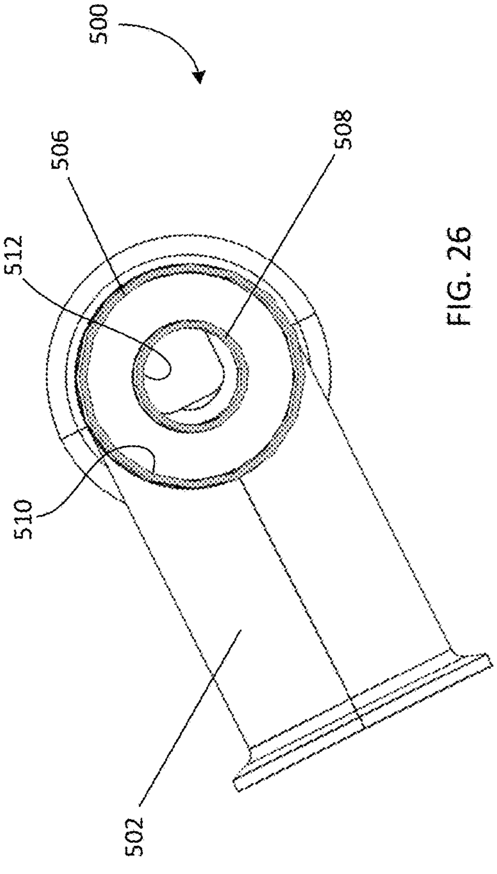
FIG. 26 is a cross-sectional view of the spray apparatus along line A-A.

Referring to FIG. 25, the inner member 508 can comprise a first end portion 516, a second end portion 518, and a plurality of channels 520 disposed along the length of the inner member 508. The channels 520 can be oriented in an opposite direction relative to the channels 514. For example, in embodiments where channels 514 are oriented toward the belt 104, channels 520 can be oriented away from the belt 104. The interior bore 512 (FIG. 26) of the inner member 508 can be fluidly coupled to the one or more inlets 502 and further to the inner bore 510 via the channels 520. The inlets 502 are configured such that wet product can be pumped from a container or trough into the interior bore 512 of the inner member 508 and subsequently through the channels 520. In some embodiments, the wet product is pumped into the inner member 508 using both inlets 502 simultaneously. In other embodiments, only one inlet can be used. In the illustrated embodiment, a respective inlet 502 is fluidly coupled to each end portion 516, 518 of the inner member 508. In other embodiments, one or more inlets 502 can be positioned at any location along the length of the inner member 508.

The channels 520 can extend through a thickness of the inner member 508 and be fluidly connected to the interior bore 512 of the inner member 508 at a first end portion (e.g., at a radially inner surface of the inner member 508) and to the inner bore 510 of the outer member 506 at a second end portion (e.g., at a radially outer surface of the inner member 508). Each channel 520 can comprise a first opening at the first end portion and a second opening at the second end portion. In the illustrated embodiment, each opening has a circular shape, however, in other embodiments the openings can have any of various shapes, for example, square, square-oval, triangular, rectangular, etc.

In use, as mentioned, wet product can be pumped into the interior bore 512 of the inner member 508 via the inlets 502. The wet product can flow through the channels 520 into the inner bore 510 of the outer member 506, where it can be sprayed out through channels 514. Such a configuration advantageously allows the spray apparatus 500 to apply a more even layer of wet product to the belt 104, which aids in the consistency of the drying process. The described configuration allows pressure within the spray apparatus 500 to equalize during use, such that each channel 514 is fed with the same amount of pressure and flow. This decreases the pressure differential throughout the length of the spray apparatus 500 preventing or mitigating issues such as sputtering and striping, which could otherwise adversely affect the application of wet product to the belt 104.

GENERAL CONSIDERATIONS

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing material quantities, angles, pressures, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosure may be applied, it should be recognized that the illustrated embodiments are only preferred examples and should not be taken as limiting the scope. Rather, the scope is defined by the following claims. We therefore claim all that comes within the scope and spirit of these claims.

The invention claimed is:

1. A drying apparatus, comprising:

a wet end portion comprising a spray apparatus configured to apply a wet product to a belt;

a dry end portion comprising a knife portion configured to remove a dry product from the belt;

a drying chamber extending between the wet end portion and the dry end portion and comprising one or more table sections, each table section comprising a basin portion and one or more temperature control elements, the drying chamber further comprising an air inlet and an air outlet such that air can flow through the drying chamber in a direction opposite a direction of the belt;

wherein the spray apparatus is an elongated member comprising a plurality of openings disposed along a length of the elongated member, the openings extending through a wall of the elongated member and being oriented toward the belt; and wherein the openings taper from a first diameter at an inner surface of the elongated member to a second diameter at an outer surface of the elongated member.

2. The drying apparatus of claim 1, wherein the wet end portion further comprises a first roller spaced apart from a second roller along a first axis, and wherein the belt is configured to extend over the first roller and beneath the second roller.

3. The drying apparatus of claim 2, wherein the first roller is offset from the second roller along a second axis such that a portion of the belt disposed between the first and second rollers is angled relative to the spray apparatus.

4. The drying apparatus of claim 1, wherein the spray apparatus is pivotable relative to the belt.

5. The drying apparatus of claim 1, wherein the elongated member is a first elongated member comprising a first plurality of openings and the spray apparatus further comprises a second elongated member disposed within an inner bore of the first elongated member.

6. The drying apparatus of claim 5, wherein the second elongated member comprises a second plurality of openings disposed along a length of the second elongated member and oriented in a direction opposite the first plurality of openings of the first elongated member.

7. The drying apparatus of claim 1, wherein the drying chamber further comprises one or more baffles configured to create turbulent airflow within the drying chamber.

8. The drying apparatus of claim 1, wherein each table section further comprises a holding tank into which the temperature control elements at least partially extend, and wherein the temperature control elements are configured adjust the temperature of a fluid disposed within the holding tank until the fluid reaches a selected temperature.

9. The drying apparatus of claim 8, wherein each table section further comprises a diffuser bar configured to allow fluid from the holding tank to be pumped into the basin portion.

10. The drying apparatus of claim 1, wherein the temperature control elements are electrically powered.

11. The drying apparatus of claim 1, wherein the temperature control elements are powered using one or more solar panels.

12. The drying apparatus of claim 1, the dry end portion further comprising a bullnose portion, wherein the bullnose portion is positioned at an angle relative to the knife portion such that when the belt passes between the bullnose portion and the knife portion, the belt forms a Z-bend.

13. The drying apparatus of claim 1, the dry end portion further comprising a top roller and a drive roller, wherein the drive roller is configured to drive the belt through the drying apparatus.

14. The drying apparatus of claim 13, wherein a leading edge of the top roller is offset from a leading edge of the drive roller along a second axis such that a portion of the belt disposed between the two rollers is angled relative to the knife portion.

15. The drying apparatus of claim 13, wherein the top roller comprises a chilled roller.

16. The drying apparatus of claim 1, further comprising a brush device configured to selectively remove remaining dry product from the belt.

17. The drying apparatus of claim 16, wherein the brush device comprises a brush portion, a first brush roller, and a second brush roller, and wherein the brush device is pivotable between an engaged position, in which the brush portion contacts the belt, and a disengaged position in which the brush portion does not contact the belt.

18. The drying apparatus of claim 1, wherein the drying apparatus is disposed within an environmental control room configured to allow an operator to adjust the humidity within the environmental control room.

19. The drying apparatus of claim 1, wherein one or more table sections are angled table sections comprising first and second side walls each having at least one angled portion such that a first opening disposed at a first end portion of the angled table section has a width narrower than a width of a second opening disposed at a second end portion of the angled table section.

20. A method of using the drying apparatus of claim 1, the method comprising:

spraying the wet product onto the belt using the spray apparatus;

driving the belt in a first direction such that the wet product moves into the drying chamber;

flowing air along the belt in a second direction opposite the first direction to remove water from the wet product to create the dry product;

driving the belt through a Z-bend to remove the dry product from the belt.

21. The method of claim 20, further comprising driving the belt through a brush device to remove any remaining dry product from the belt.

* * * * *